US012791963B2

(12) United States Patent
Nakasato

(10) Patent No.: US 12,791,963 B2
(45) Date of Patent: Nov. 10, 2026

(54) IMAGE FORMING APPARATUS

(71) Applicant: CANON KABUSHIKI KAISHA, Tokyo (JP)

(72) Inventor: Go Nakasato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/254,116

(22) Filed: Jun. 30, 2025

(65) Prior Publication Data

US 2026/0010098 A1 Jan. 8, 2026

(30) Foreign Application Priority Data

Jul. 3, 2024 (JP) ................................ 2024-107388

(51) Int. Cl.

*G03G 15/08* (2006.01)
*G03G 15/04* (2006.01)
*G03G 21/16* (2006.01)
*G03G 21/20* (2006.01)

(52) U.S. Cl.

CPC ..... *G03G 15/0898* (2013.01); *G03G 15/0409* (2013.01); *G03G 21/1647* (2013.01); *G03G 21/206* (2013.01); *G03G 2221/163* (2013.01)

(58) Field of Classification Search

CPC ........... G03G 15/0409; G03G 15/0898; G03G 21/1647; G03G 21/206; G03G 2221/163; G03G 21/1676

See application file for complete search history.

(56) References Cited

U.S. PATENT DOCUMENTS

2014/0205309 A1* 7/2014 Kawasumi ........... G03G 21/206 399/92
2020/0096901 A1* 3/2020 Noguchi ............ G03G 15/0896
2020/0159142 A1* 5/2020 Omura ............... G03G 15/0216

FOREIGN PATENT DOCUMENTS

JP 2022-156782 A 10/2022

* cited by examiner

*Primary Examiner* — Hoang X Ngo
(74) *Attorney, Agent, or Firm* — VENABLE LLP

(57) ABSTRACT

An image forming apparatus includes an exposing portion, a developing apparatus, a supporting portion including a main body portion, and first and second rails. A duct allows air to flow into a space surrounded by the developing apparatus, the main body portion, the first rail, and the second rail, and a first sealing member seals a space between a first surface of the duct and a second surface of the main body portion, with the first surface being located on a main body portion side of the duct, and the second surface being located further upstream of an upstream end of the first rail and an upstream end of the second rail. A second sealing member disposed downstream of the first sealing member in the inserting direction and seals a space between the first surface and the upstream end in the inserting direction of the first rail.

5 Claims, 26 Drawing Sheets

IMAGE FORMING APPARATUS

BACKGROUND

Field of the Technology

The present disclosure relates to image forming apparatuses, such as a printer, a copying machine, a facsimile, or a multifunction machine.

Description of the Related Art

In image forming apparatuses, electrostatic latent images are formed on charged photosensitive drums using exposing portions in which a plurality of light emitting elements such as LEDs and organic ELs are aligned along a rotational axis direction of the photosensitive drums. Each exposing portion includes a lens array in which a plurality of lenses are aligned in the rotational axis direction, i.e., longitudinal direction, of the photosensitive drum so as to focus light emitted from the respective light emitting elements on the surface of the photosensitive drum. The focal length of the lens array is extremely short, and thus, the exposing portion is disposed near the photosensitive drum.

The exposing portion described above is also positioned close to a developing apparatus that develops the electrostatic latent image formed on the photosensitive drum into a toner image, and the heat generated by the exposing device including the exposing portion may affect the toner stored in the developing apparatus. Therefore, in order to suppress the influence of heat on the toner, air is supplied from the exterior of the image forming apparatus to cool the developing apparatus (Japanese Patent Application Laid-Open Publication No. 2022-156782). According to the apparatus disclosed in Japanese Patent Application Laid-Open Publication No. 2022-156782, the developing apparatus is supported in an insertable and extractable manner with respect to a cartridge tray, and a cooling space through which air supplied from the exterior of the apparatus body is passed is formed between the developing apparatus and the cartridge tray. The image forming apparatus is equipped with an inner door that is disposed to open and close on the apparatus body, and on the inner side of the inner door is provided a connecting port, i.e., duct, for passing through external air into the cooling space.

SUMMARY

According to one aspect of the present disclosure, an image forming apparatus includes an apparatus body, a photosensitive member, an exposing portion including a plurality of light emitting elements arranged adjacent to the photosensitive member and aligned in a longitudinal direction of the photosensitive member, the light emitting elements being configured to emit light, and a lens array having a plurality of lenses configured to focus light emitted from the light emitting elements on a surface of the photosensitive member, the exposing portion being configured to expose the surface of the photosensitive member to form an electrostatic latent image, a developing apparatus configured to be detachably attached to the apparatus body, the developing apparatus being arranged adjacent to the exposing portion with respect to a width direction intersecting the longitudinal direction in a state attached to the apparatus body, and being configured to develop the electrostatic latent image on the photosensitive member into a toner image, a supporting portion configured to support the developing apparatus in an insertable and extractable manner along the longitudinal direction when attaching and detaching the developing apparatus to and from the apparatus body, the supporting portion including a main body portion, and first and second rails that are disposed along the longitudinal direction on a surface facing the developing apparatus of the main body portion, the first rail being closer to the exposing portion in the width direction than the second rail is, a duct disposed on the developing apparatus and configured to allow air to flow in an inserting direction of the developing apparatus from an upstream side of the developing apparatus into a space surrounded by the developing apparatus, the main body portion, the first rail, and the second rail, in a state where the developing apparatus is attached to the apparatus body, a first sealing member configured to seal a space between a first surface of the duct and a second surface of the main body portion in a state where the developing apparatus is attached to the apparatus body, the first surface being located on a main body portion side of the duct, the second surface being located further upstream of an upstream end of the first rail and an upstream end of the second rail in the inserting direction, and a second sealing member disposed downstream of the first sealing member in the inserting direction and configured to seal a space between the first surface and the upstream end in the inserting direction of the first rail in the state where the developing apparatus is attached to the apparatus body.

Features of the present disclosure will become apparent from the following description of embodiments with reference to the attached drawings. The following description of embodiments are described by way of example.

DESCRIPTION OF THE EMBODIMENTS

Hitherto, there was a risk that a portion of air supplied through a gap formed between a connecting portion, i.e., duct, and a cartridge tray could flow into the apparatus body without passing through a cooling space. Specifically, the air flowing through the apparatus body toward an exposing portion tends to scatter toner, and the scattered toner may adhere to the exposing portion and cause image defects.

The present disclosure provides an image forming apparatus capable of suppressing air from a duct from flowing toward the exposing portion without passing through the cooling space in a configuration where air from the exterior flows through the duct disposed on a developing apparatus into the cooling space formed between the developing apparatus and a cartridge tray.

Image Forming Apparatus

Figure 1:
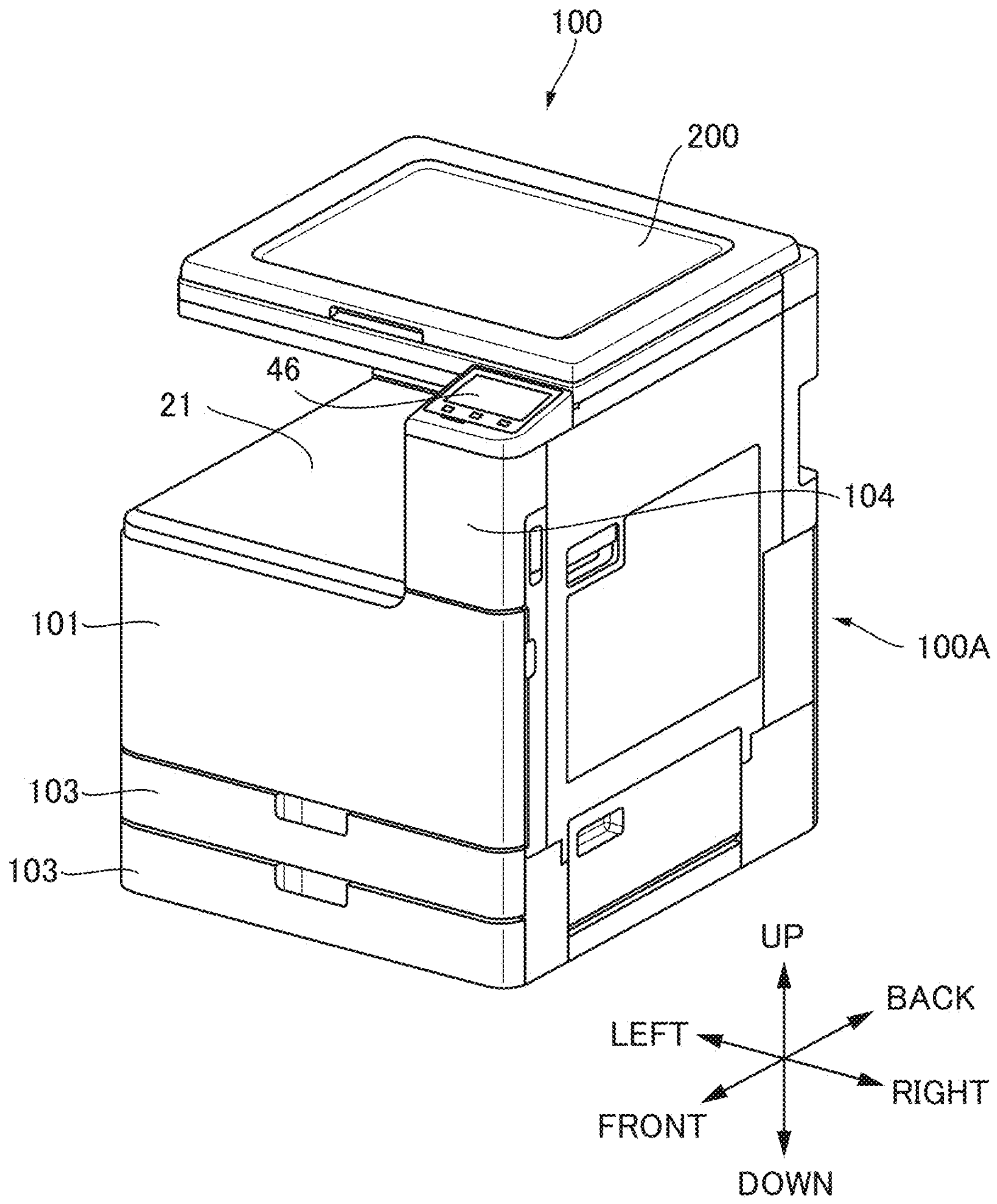
FIG. 1 is an external perspective view of an image forming apparatus according to a present embodiment.

A present embodiment will be described below. At first, an outline of an image forming apparatus according to the present embodiment will be described with reference to FIGS. 1 to 3. As illustrated in FIG. 1, an image forming apparatus 100 according to the present embodiment is a so-called in-body sheet discharge-type image forming apparatus. That is, the image forming apparatus 100 includes an apparatus body 100A, and a document reading apparatus 200 for reading an image information from a document, wherein a sheet discharge tray 21 that supports sheets S, i.e., recording material, discharged from the apparatus body 100A is disposed between the apparatus body 100A and the document reading apparatus 200. The image forming apparatus 100 forms a toner image according to an image signal sent from the document reading apparatus 200 or from an external apparatus not shown, such as a personal computer, on a sheet S.

The apparatus body 100A has, on a front side thereof, an operation portion 46 including a display unit capable of displaying various information and keys through which various information may be entered through user operation. In the present specification, a side from which a developing unit described below disposed in an insertable and extractable manner with respect to the apparatus body 100A is inserted or extracted by the user from the exterior of the apparatus body 100A is referred to as "front", or front side, and a side opposite therefrom is referred to as "back" or rear side. Further, a left side when the image forming apparatus 100 is viewed from the front is referred to as "left", and a right side when the image forming apparatus 100 is viewed from the front is referred to as "right".

The apparatus body 100A is composed, for example, of a front side plate disposed on a front side of the image forming apparatus 100, a rear side plate disposed on a rear side and supporting various units together with the front side plate, a stay that connects the front side plate and the rear side plate, and a plurality of metal plates such as support columns for supporting the front side plate, which are covered by an external cover that constitutes an exterior of the image forming apparatus 100. As the external cover, a front cover 101, a plurality of cassette covers 103, and an upper front cover 104 are disposed on the front side. Further, side surface covers are disposed on right and left sides, and a back cover is disposed on a rear side.

Figure 2:
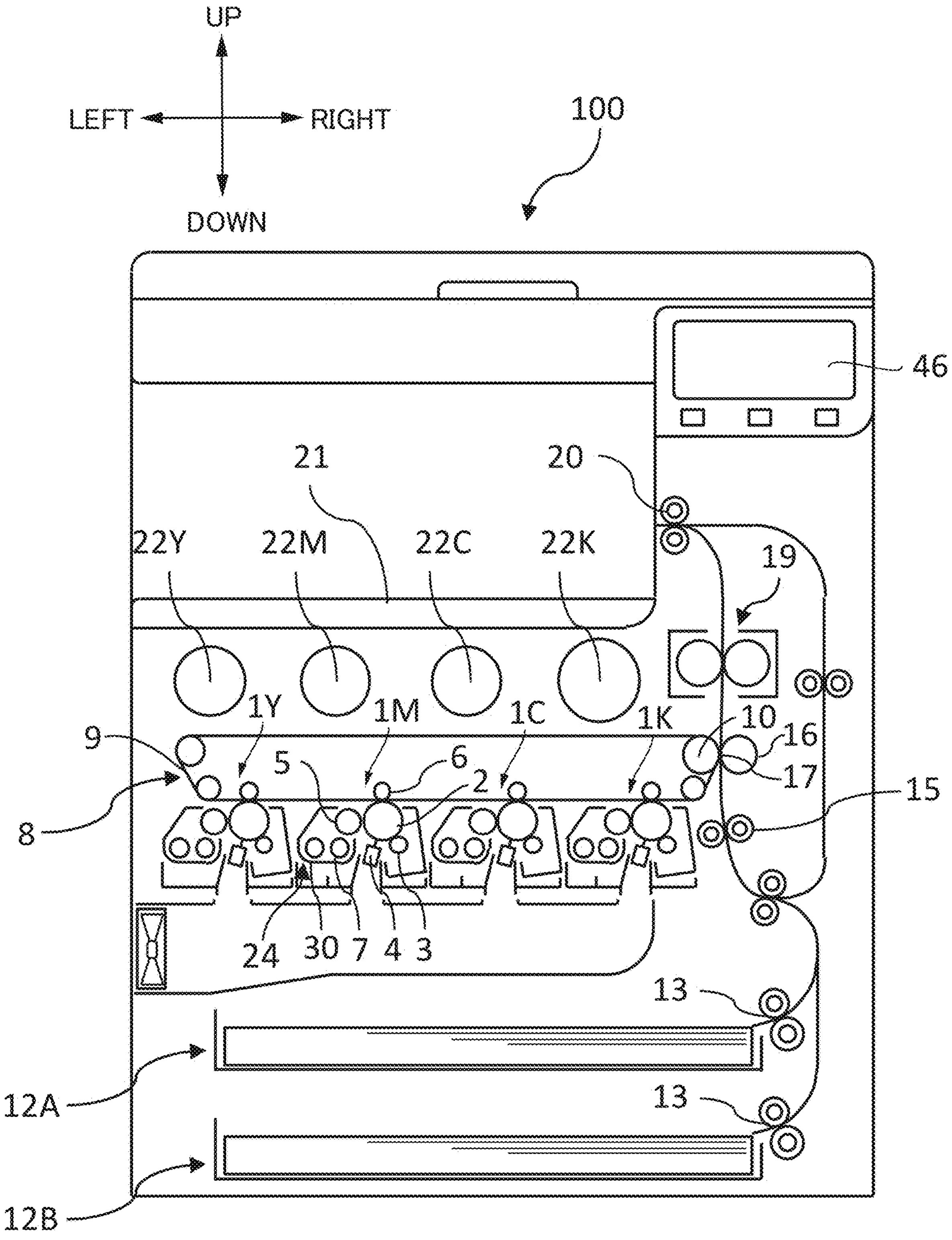
FIG. 2 is a schematic drawing illustrating a configuration of the image forming apparatus.
Figure 3:
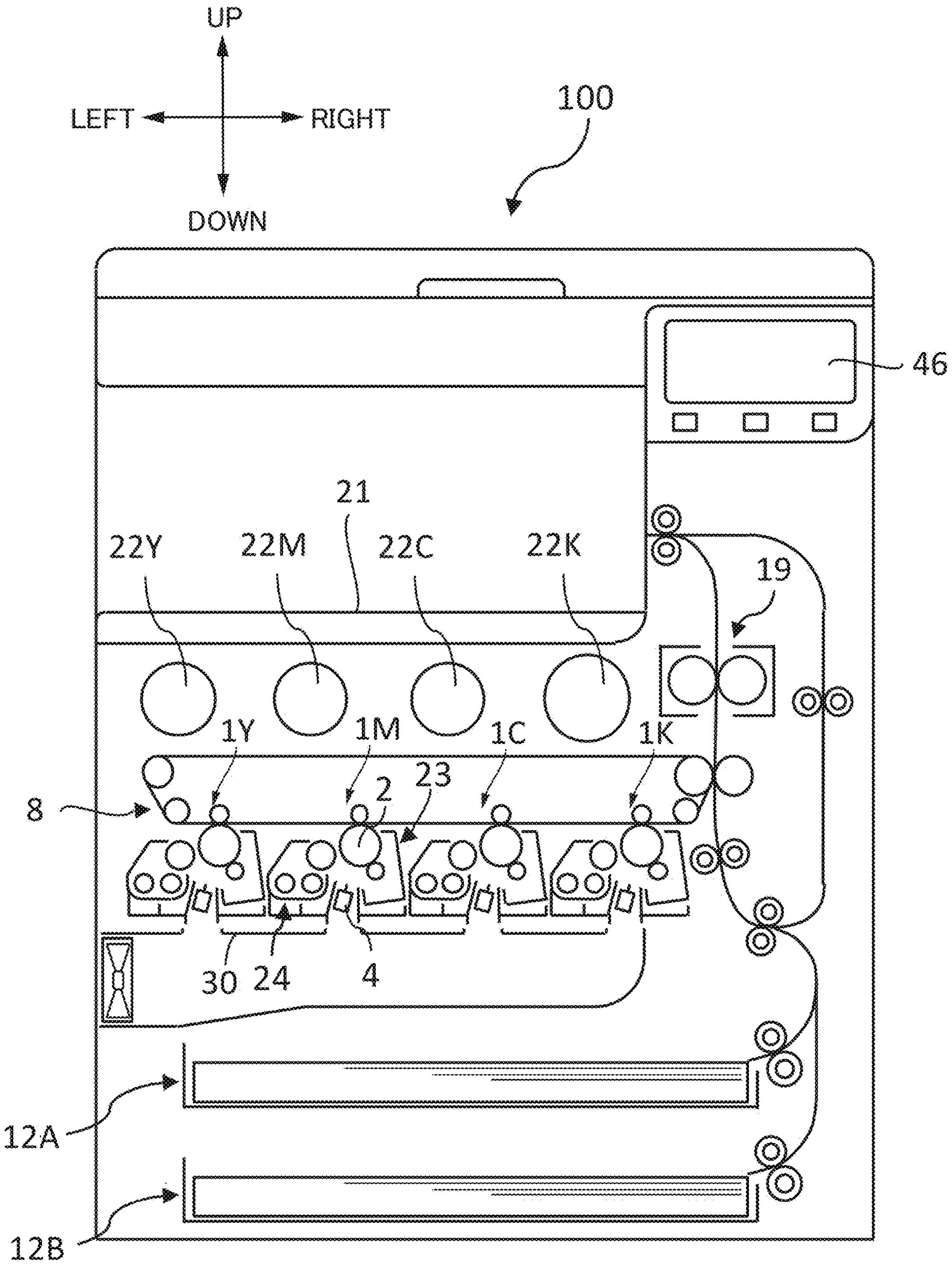
FIG. 3 is a schematic drawing illustrating an image forming apparatus in a state where a developing sleeve and an exposure unit are at a separated position.

The image forming apparatus 100 illustrated in FIGS. 2 and 3 includes four image forming units 1Y, 1M, 1C, and 1K corresponding to four colors, which are yellow (Y), magenta (M), cyan (C), and black (K). The configurations of the image forming units 1Y, 1M, 1C, and 1K for forming toner images of respective colors are similar, such that in FIGS. 2 and 3, only the image forming unit 1M for magenta has reference numbers assigned thereto, and the image forming unit 1M is described below as an example.

The image forming unit 1M is equipped with two units, which are a drum unit 23 and a developing unit 24 (refer to FIG. 3). The drum unit 23 and the developing unit 24 are supported by a cartridge tray 30 and disposed in a manner capable of being inserted to and extracted from the cartridge tray 30 from a front side of the apparatus body 100A so as to be guided in a rotational axis direction, i.e., longitudinal direction, of a photosensitive drum 2, each photosensitive drum 2 being rotated about its rotation shaft. The drum unit 23 includes the photosensitive drum 2 serving as a photosensitive member, a charging roller 3 that charges the photosensitive drum 2, and a drum cleaner portion not shown.

The developing unit 24 serving as a developing apparatus includes a developing sleeve 5 that is disposed on a developer container storing developer containing toner and that supplies toner to the photosensitive drum 2 to form a toner image, and a conveying screw 7 that agitates and conveys toner. An exposure unit 4 for exposing a surface of the photosensitive drum 2 and forming an electrostatic latent image thereon is disposed between the drum unit 23 and the developing unit 24 in the direction of rotation of the photosensitive drum 2. The exposure unit 4 serving as an exposing portion is supported on the cartridge tray 30.

An intermediate transfer belt unit 8 is arranged above the image forming units 1Y to 1K. The intermediate transfer belt unit 8 includes four primary transfer rollers 6 that are arranged to face the photosensitive drums 2 of respective colors, and one intermediate transfer belt 9 having an endless shape. Toner bottles 22Y to 22K storing replenishment toner for replenishment to the developing unit 24 are disposed attachably/detachably in a toner replenishment mechanism not shown in the area above the intermediate transfer belt unit 8. An appropriate amount of toner is replenished from the toner bottles 22Y to 22K at an appropriate timing by the toner replenishment mechanism to the respective developing units 24 of the corresponding image forming units 1Y to 1K. Sheet cassettes 12A and 12B storing sheets S are disposed below the image forming units 1Y to 1K.

Image Forming Process

Next, an image forming process for forming an image on a sheet S in the image forming apparatus 100 will be described below. In the respective image forming units 1Y to 1K, the surface of the photosensitive drum 2 driven to rotate by a motor not shown is charged uniformly by the charging roller 3 being in pressure contact with the photosensitive drum 2. Thereafter, light is emitted from the exposure unit 4 driven based on an image information signal, and an electrostatic latent image is formed on the surface of the photosensitive drum 2. The electrostatic latent image formed on a photosensitive drum 1 is developed into a toner image by the developing unit 24. The developing unit 24 develops the electrostatic latent image by toner contained in the developer, and a toner image is formed on the photosensitive drum 1.

By applying high voltage to the developing sleeve 5 in the developing unit 24, toner having been electrically charged by agitation performed by the conveying screw 7 is coated uniformly on the surface of the developing sleeve 5. The conveying screw 7 is rotated at a relatively high speed with respect to the rotational speed of the developing sleeve 5 or the photosensitive drum 2, and thereby, toner is coated uniformly on the surface of the developing sleeve 5.

The toner image formed on the photosensitive drum 2, i.e., on the photosensitive member, is primarily transferred from the photosensitive drum 2 to the intermediate transfer belt 9 by having a primary transfer voltage applied to the primary transfer rollers 6 that are arranged to face the image forming units 1Y to 1K interposing the intermediate transfer belt 9. The drum cleaner portion not shown collects transfer residual toner remaining on the photosensitive drum 2 after primary transfer.

A sheet conveyance path that conveys the sheets S upward from a lower side is disposed on the right side in the apparatus body 100A of the image forming apparatus 100. Along the sheet conveyance path from the lower side toward the upper side are disposed, in the named order, a feed roller pair 13, a registration roller pair 15, a secondary transfer outer roller 16, a fixing unit 19, and a sheet discharge roller pair 20. The secondary transfer outer roller 16 abuts against a secondary transfer inner roller 10 arranged on an inner side of the intermediate transfer belt 9 interposing the intermediate transfer belt 9 with a predetermined pressing force, forming a secondary transfer nip portion 17.

The sheets S stored in the sheet cassettes 12A and 12B are fed one by one to the sheet conveyance path from either one of the sheet cassettes 12A and 12B by having the feed roller pair 13 driven at a predetermined control timing. The sheet S fed by the feed roller pair 13 is conveyed to the registration roller pair 15 arranged in midway of the conveyance path. Then, skew correction and timing correction of the sheet S is performed by the registration roller pair 15, and the sheet S is sent to the secondary transfer nip portion 17. The secondary transfer nip portion 17 is composed of the secondary transfer inner roller 10 and the secondary transfer outer roller 16 that face each other with the intermediate transfer belt 9 interposed therebetween, and serves as a nip portion where the toner image is transferred from the intermediate transfer belt 9 to the sheet S by applying a predetermined pressing force and a secondary transfer voltage.

The image forming processes of respective colors that are processed simultaneously by the image forming units 1Y to 1K of respective colors described above are performed at such a timing that the toner images are sequentially superposed on a color toner image that has been primarily transferred upstream thereof in a movement direction on the intermediate transfer belt 9. As a result, a full-color toner image is formed on the intermediate transfer belt 9 and conveyed to the secondary transfer nip portion 17. The timings at which the sheet S and the full-color toner image arrive at the secondary transfer nip portion 17 correspond, and a secondary transfer in which the toner image is transferred from the intermediate transfer belt 9 onto the sheet S is performed. Thereafter, the sheet S is conveyed to the fixing unit 19, and by having heat and pressure applied at the fixing unit 19, the toner image is fixed to the sheet S. The sheet S having passed through the fixing unit 19 is conveyed to the sheet discharge roller pair 20, and discharged by the sheet discharge roller pair 20 onto the sheet discharge tray 21.

In the present embodiment, the drum unit 23 and the developing unit 24 are degraded through repeated image forming processes, such that replacement and maintenance operations thereof become necessary. The drum unit 23 and the developing unit 24 are in the form of cartridges so as to facilitate insertion and extraction thereof to and from the apparatus body 100A by the user for replacement and maintenance. FIG. 3 illustrates the arrangement of the drum unit 23, the developing unit 24, and the exposure unit 4 when inserting and extracting the drum unit 23 and the developing unit 24.

As illustrated in FIG. 3, when inserting and extracting the drum unit 23 and the developing unit 24, unlike the state illustrated in FIG. 2, the developing unit 24 and the exposure unit 4 are separated from the drum unit 23. This is because when inserting and extracting the drum unit 23 or the developing unit 24, if the developing unit 24 and the exposure unit 4 are arranged close to the photosensitive drum 2, there is a risk that the dynamic interaction during insertion and extraction of the drum unit 23 or the developing unit 24 may cause the units to be damaged or may cause the units to be non-extractable from the apparatus. Therefore, the user can separate the developing unit 24 and the exposure unit 4 before inserting and extracting the drum unit 23 and the developing unit 24.

Exposure Unit

Figure 4:
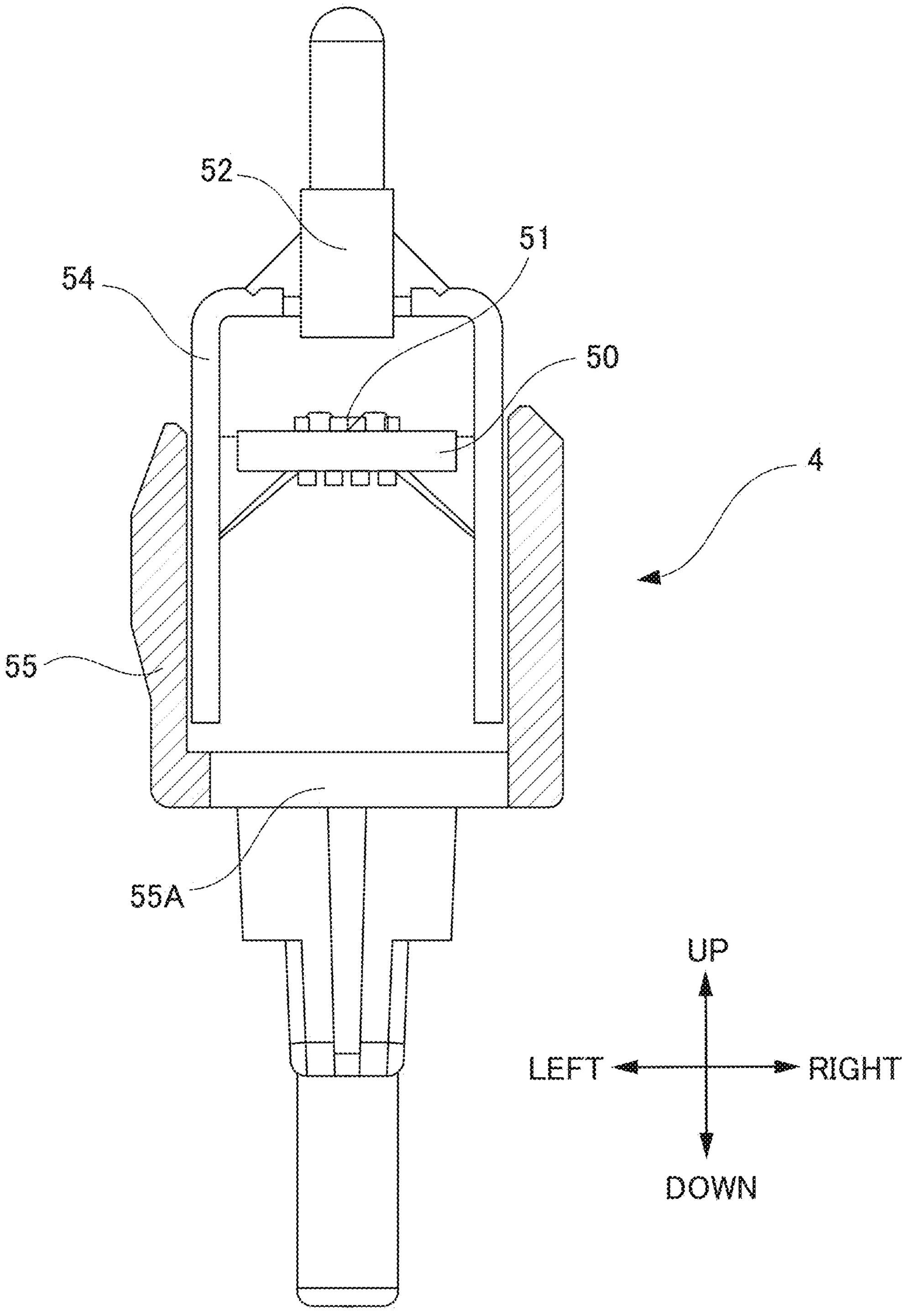
FIG. 4 is a cross-sectional view of the exposure unit.
Figure 5:
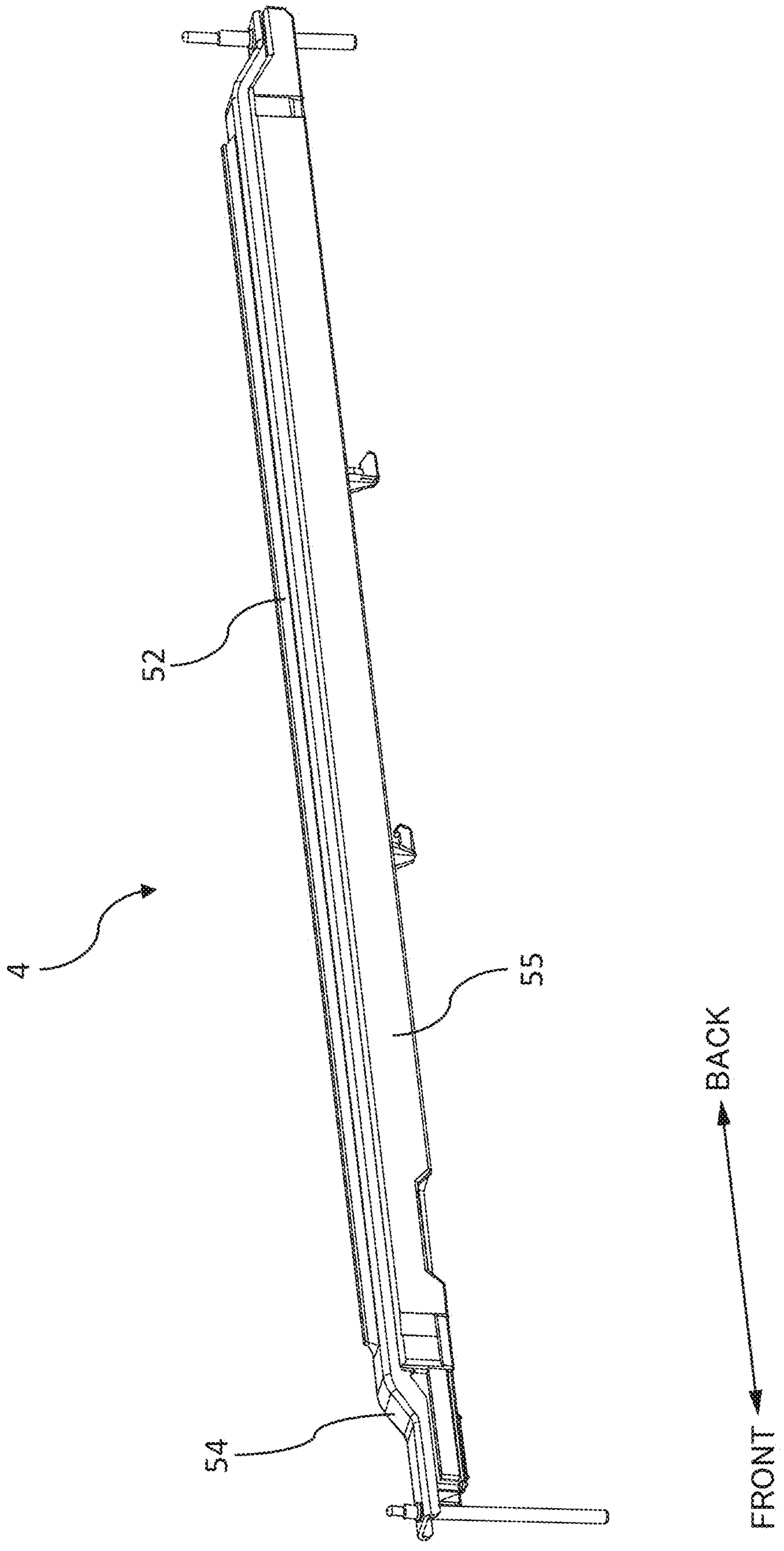
FIG. 5 is a perspective view of the exposure unit.
Figure 6:
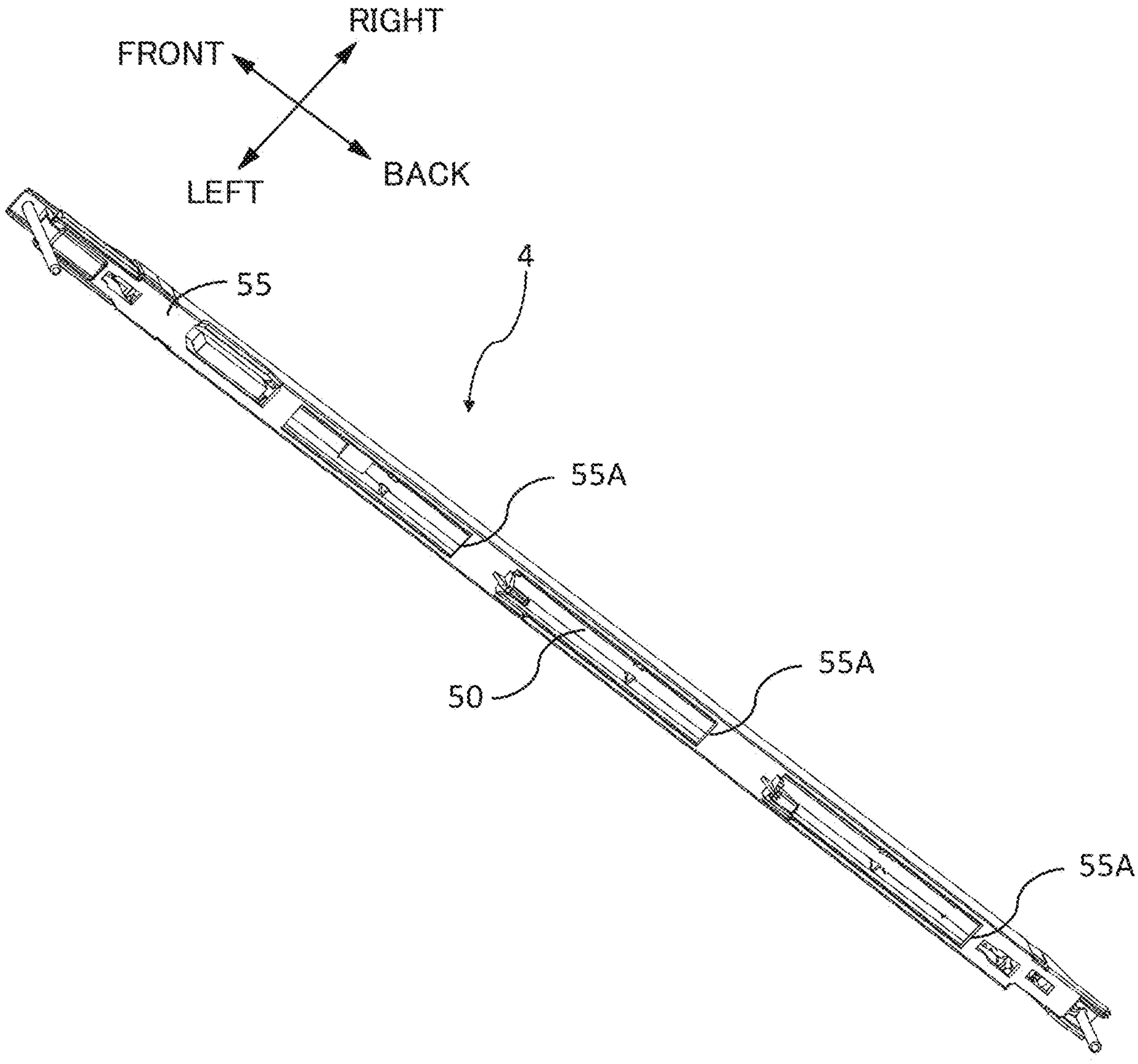
FIG. 6 is a perspective view of a bottom surface of the exposure unit.

Next, the exposure unit 4 will be described based on FIGS. 4 to 6 with reference to FIG. 3. As illustrated in FIG. 4, the exposure unit 4 includes a mounting substrate 50, a plurality of light emitting elements 51 that are aligned along a longitudinal direction on one surface of the mounting substrate 50, and a lens array 52 in which are arranged a plurality of lenses through which light emitted from the light emitting elements 51 are transmitted. The light emitting elements 51 may be, for example, light emitting diodes (LEDs) or organic electro-luminescences (organic ELs). The lens array 52 has a plurality of lenses arranged along a direction of alignment of the light emitting elements 51.

The mounting substrate 50 and the lens array 52 have a plurality of light emitting elements 51 and a plurality of lenses arranged across an exposure range in a rotational axis direction of the photosensitive drum 2. Therefore, as illustrated in FIG. 5, the mounting substrate 50 and the lens array 52 are formed in a shape extending along the rotational axis direction of the photosensitive drum 2. The mounting substrate 50 and the lens array 52 are retained by being bonded highly accurately onto a casing 54 using an adhesive. The casing 54 must have high stiffness, and in the present embodiment, a metal plate such as a galvanized sheet iron or a cold rolled steel plate bent to have an approximately U-shaped cross section is adopted. The lens array 52 and the mounting substrate 50 are inserted sequentially from an opened side of the U shape with respect to the casing 54, and fixed by an adhesive.

The casing 54 further has a casing support member 55 having an approximately U-shaped cross section disposed integrally on an opening side of the U shape of the casing 54. As illustrated in FIG. 6, in each casing 54, an opening 55A that is formed to pass through the inner side and the outer side of the casing support member 55 is formed on a bottom portion of the casing support member 55 at a position facing a rear surface opposite to the front surface of the mounting substrate 50. As described above, the exposure unit 4 is composed as an integrated head unit by the mounting substrate 50 on which the plurality of light emitting elements 51 are mounted, the lens array 52 in which a plurality of lenses are aligned in parallel, the casing 54, and the casing support member 55.

Figure 7:
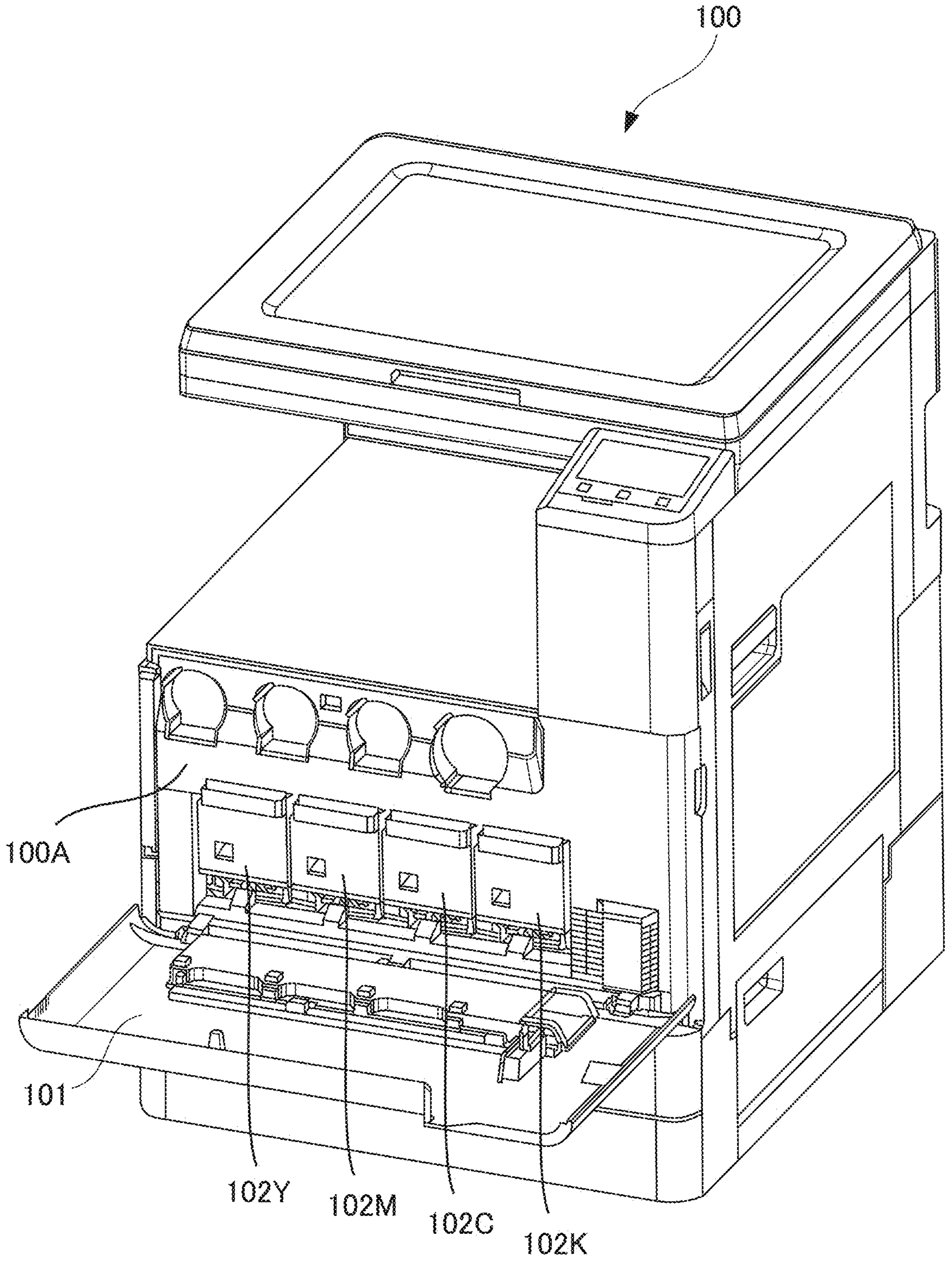
FIG. 7 is a perspective view illustrating a state in which a front cover is opened.

Next, the inserting and extracting of the drum unit 23 and the developing unit 24 to and from the apparatus body 100A will be described with reference to FIGS. 7 to 11. As illustrated in FIG. 7, the image forming apparatus 100 is equipped with inner doors 102Y, 102M, 102C, and 102K, hereinafter also generally simply referred to as "inner door 102", that cover the front sides of both the drum unit 23 and the developing unit 24 attached to the apparatus body 100A. The inner door 102 is a member that is required to protect the drum unit 23, the developing unit 24, and the exposure unit 4, and to prevent the photosensitive drum 2 from being exposed other than by the image forming process, and it is disposed openably/closably at a position facing the front side of each unit of the respective colors.

Figure 8:
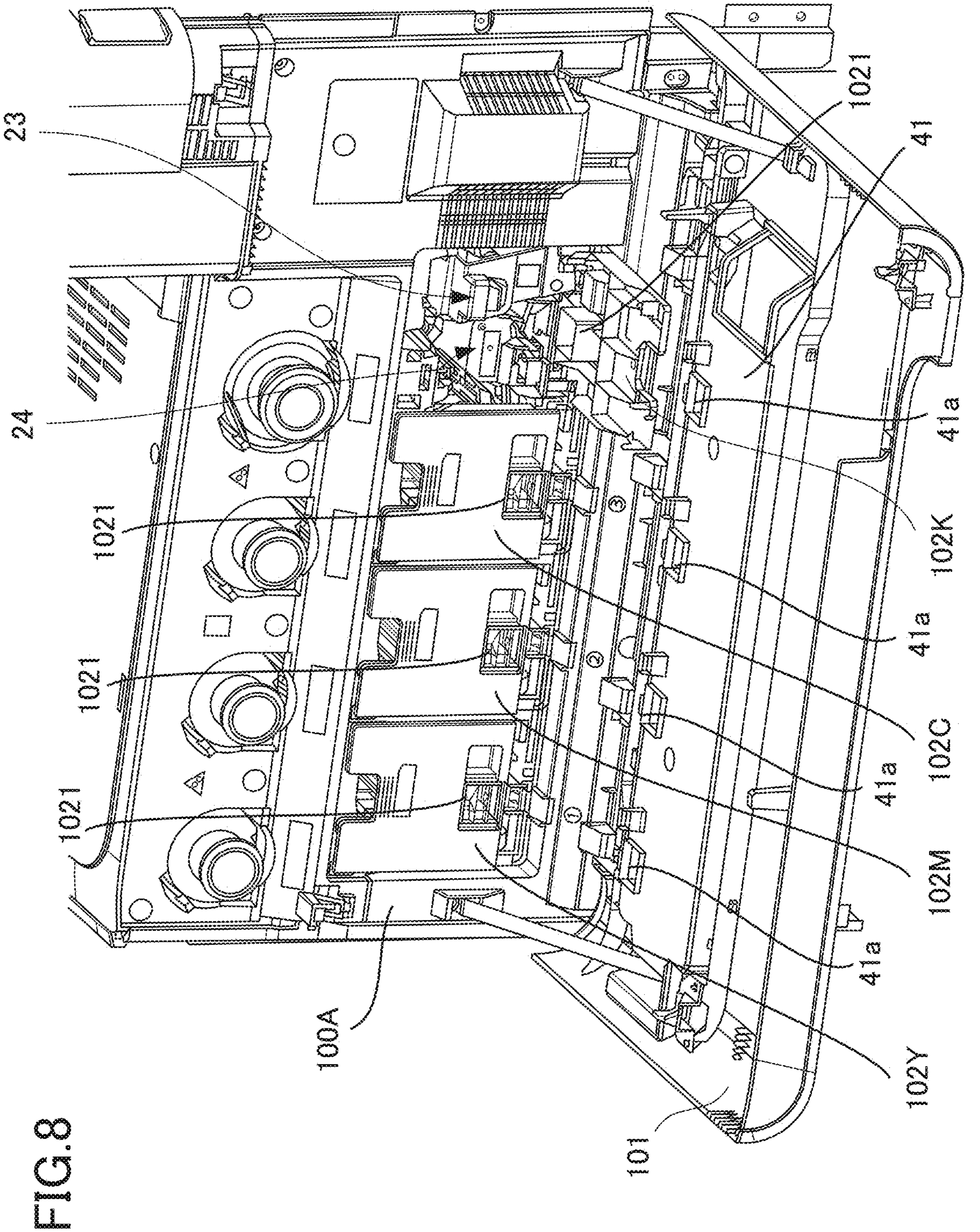
FIG. 8 is an enlarged view illustrating a state in which the front cover and an inner door are opened.
Figure 9:
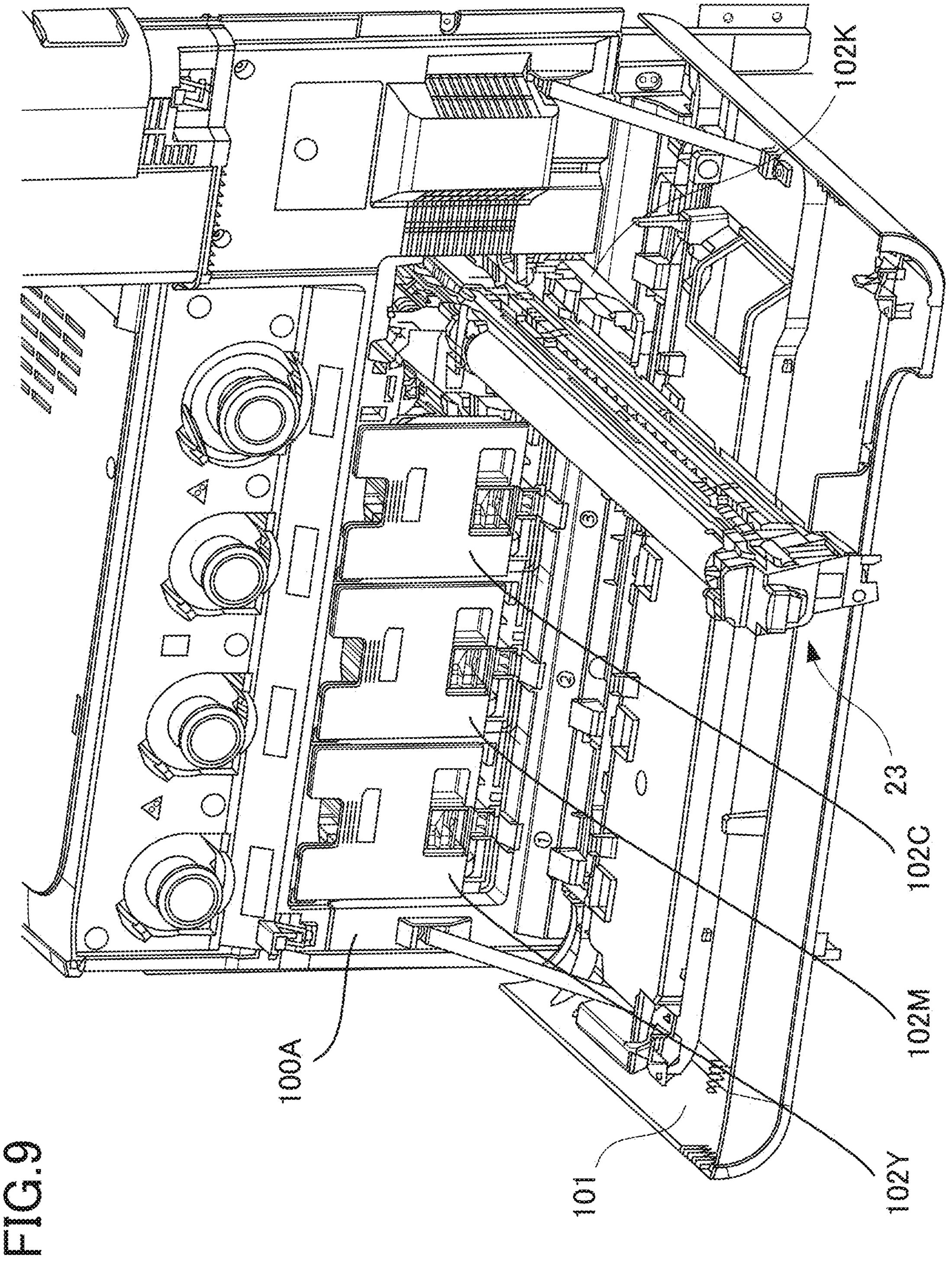
FIG. 9 is an enlarged view illustrating a state in which a drum unit is removed.
Figure 10:
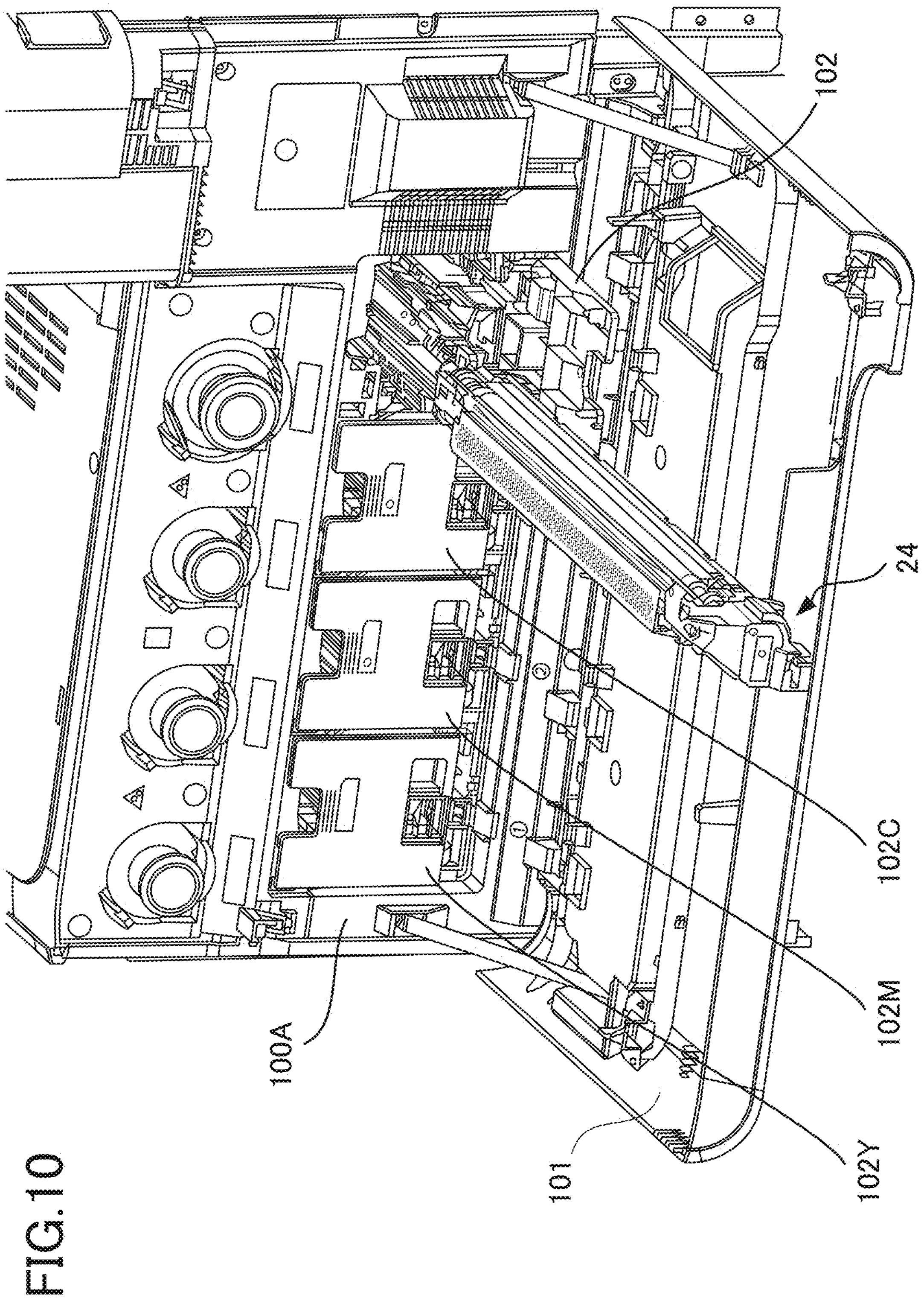
FIG. 10 is an enlarged view illustrating a state in which a developing unit is removed.

As illustrated in FIGS. 8 to 10, the inner door 102 has a first end fixed by a hinge to a front side of the cartridge tray 30, and it is disposed pivotably with respect to the cartridge tray 30 by the hinge. The developing unit 24 and the exposure unit 4 are disposed connectably and separably with respect to the drum unit 23 by a contact/separation mechanism described below that is interlocked with the opening and closing of the inner door 102. The developing unit 24 moves between a developing position which is close to the photosensitive drum 2 and enables the electrostatic latent image to be developed and a separated position which is separated from the photosensitive drum 2 for maintenance such as cleaning. The exposure unit 4 moves between an exposure position which is adjacent to the photosensitive drum 2 and enables the photosensitive drum 2 to be exposed and a separated position which is separated from the photosensitive drum 2 and does not enable the photosensitive drum 2 to be exposed. FIGS. 8 to 10 illustrate a state in which only the inner door 102K that is opened and closed for inserting and extracting the drum unit 23 and the developing unit 24 of the image forming unit 1K for black is opened.

Further, the front cover 101 is disposed in an openable/closable manner on the front side of the image forming apparatus 100. The front cover 101 has a first end fixed by a hinge to a front side of the apparatus body 100A of the image forming apparatus 100, and disposed pivotably with respect to the apparatus body 100A of the image forming apparatus 100 by the hinge. The front cover 101 is disposed on a front side of the inner door 102 in the rotational axis direction of the photosensitive drum 2. The front cover 101 is an external cover that constitutes an exterior of the image forming apparatus 100 so as to cover the entirety of the plurality of inner doors 102 that are arranged in the right-left direction in a closed state illustrated in FIG. 1.

The front cover 101 includes a front door duct 41 that introduces the air outside the apparatus body 100A to the respective developing units 24, as illustrated in FIG. 8. The front door duct 41 is formed on a rear surface of the front cover 101 opposite to the front surface that constitutes a portion of the exterior of the image forming apparatus 100 and extending in the right-left direction, which is the direction in which the developing units 24 are aligned. The front door duct 41 has openings 41*a* at positions corresponding to the developing units 24 of respective colors. Each opening 41*a* on the front door duct 41 is positioned to face an inner door duct 1021 of the inner door 102 in the rotational axis direction of the photosensitive drum 2, and when the front cover 101 is closed, the opening 41*a* communicates with the inner door duct 1021 on the inner door 102.

The replacement of the drum unit 23 or the developing unit 24 by the user is performed by the following procedure. The user opens the front cover 101 as illustrated in FIG. 7, and thereafter opens the inner door 102 as illustrated in FIG. 8, by which the drum unit 23 may be extracted from the apparatus body 100A in a state where the developing unit 24 is separated from the photosensitive drum 2 (refer to FIG. 9). Alternatively, the user may extract from the apparatus body 100A the developing unit 24 while it is in a state separated from the photosensitive drum 2 (refer to FIG. 10). Then, the user may insert a new drum unit 23 or new developing unit 24, close the inner door 102, and thereafter close the front cover 101 to complete replacement of the drum unit 23 or the developing unit 24.

Figure 11:
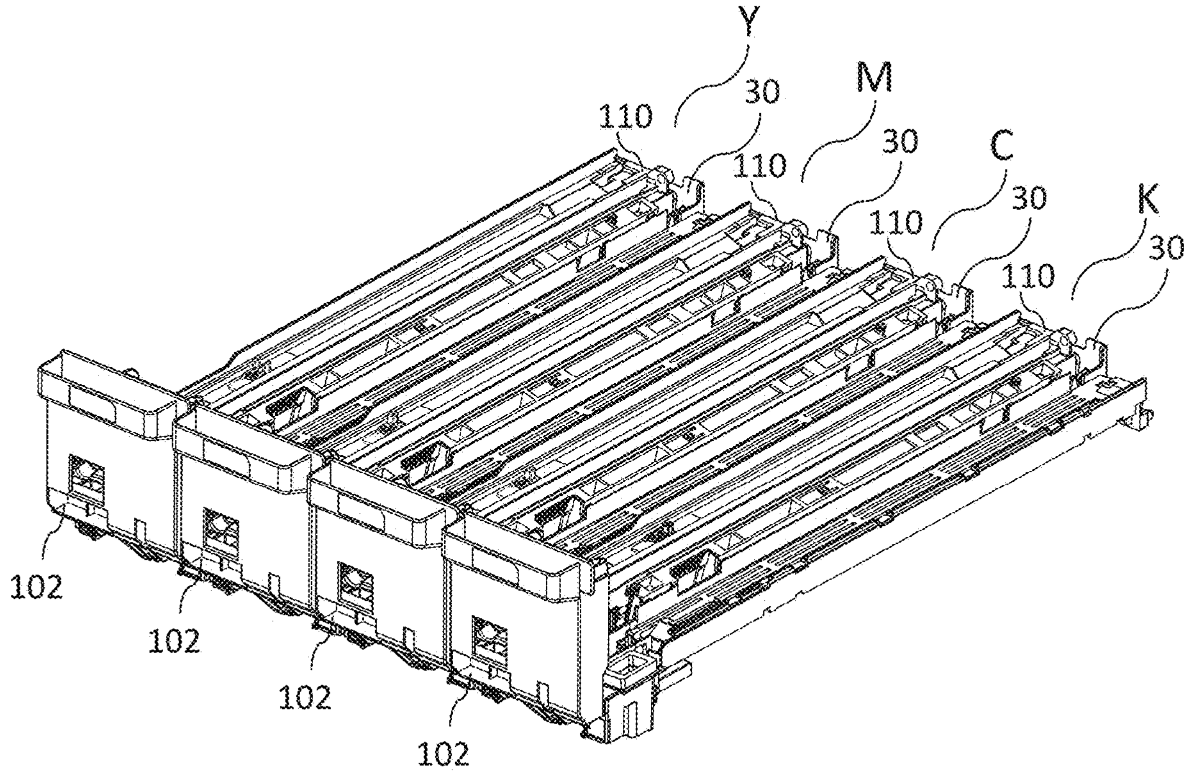
FIG. 11 is a perspective view illustrating a connecting state of a plurality of cartridge trays connected in parallel.

The cartridge tray 30 is disposed for each of the image forming units 1Y to 1K (refer to FIG. 2), and supports the drum unit 23 and the developing unit 24 described above in an insertable and extractable manner along the rotational axis direction, i.e., longitudinal direction, of the photosensitive drum 2. In the present embodiment, as illustrated in FIG. 11, by connecting four cartridge trays 30 together, the connected four cartridge trays 30 may be assembled collectively to the apparatus body 100A when assembling the image forming apparatus 100. As described, by assembling the cartridge trays 30 in the connected state to the apparatus body 100A, the assembling property may be improved compared to a state where the cartridge trays 30 are respectively assembled to the apparatus body 100A in a non-connected state.

Developing Unit Contact/Separation Mechanism

The developing unit 24 comes into contact with and separates from the drum unit 23 by a contact/separation mechanism that is interlocked with the opening/closing operation of the inner door 102. The contact/separation mechanism of the developing unit 24 will be described based on FIGS. 12 to 16 with reference to FIG. 2. As described above, the developing unit 24 and the exposure unit 4 are supported on the cartridge tray 30.

Figure 12:
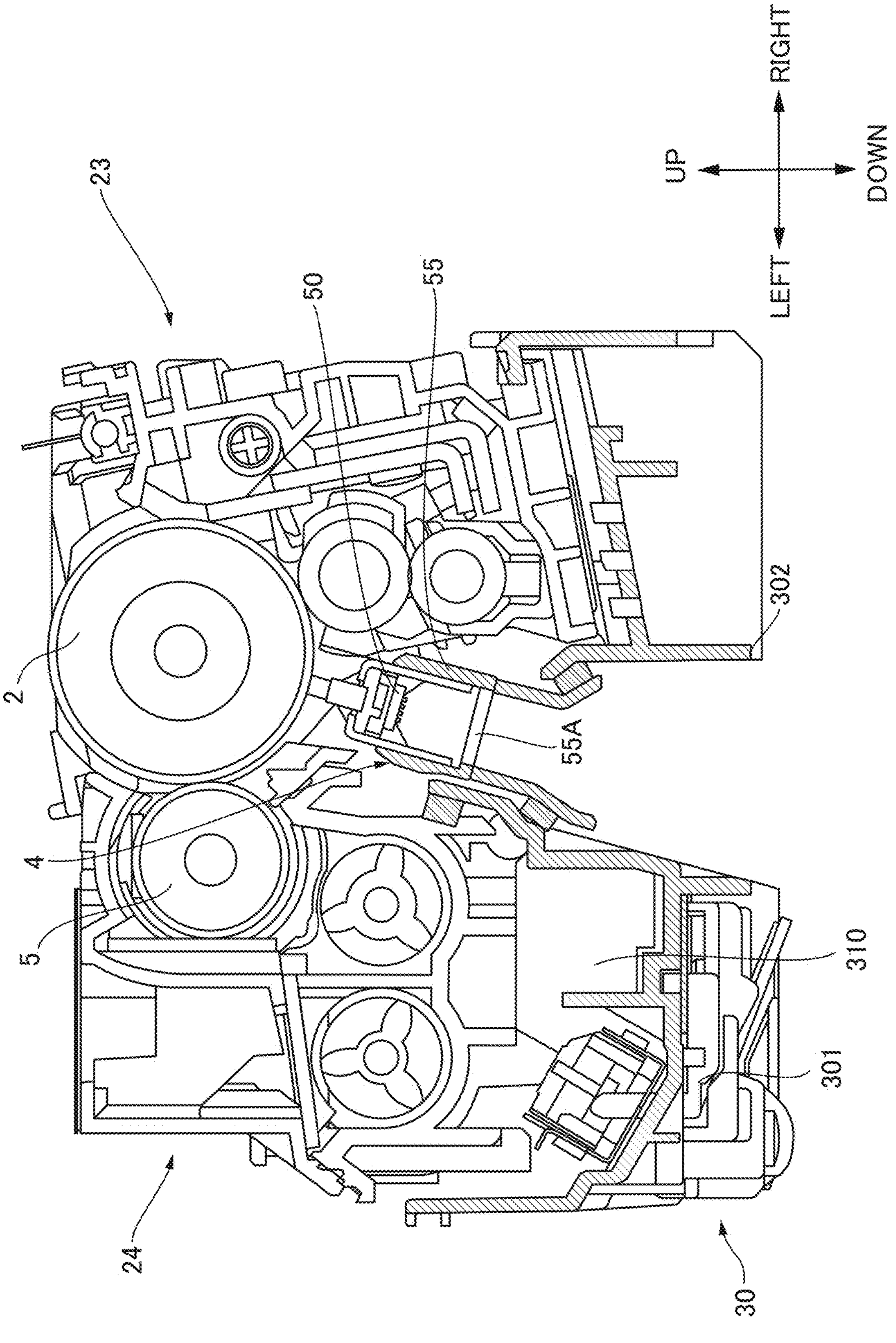
FIG. 12 is a cross-sectional view of a drum unit, a developing unit, an exposure unit, and a cartridge tray.
Figure 13:
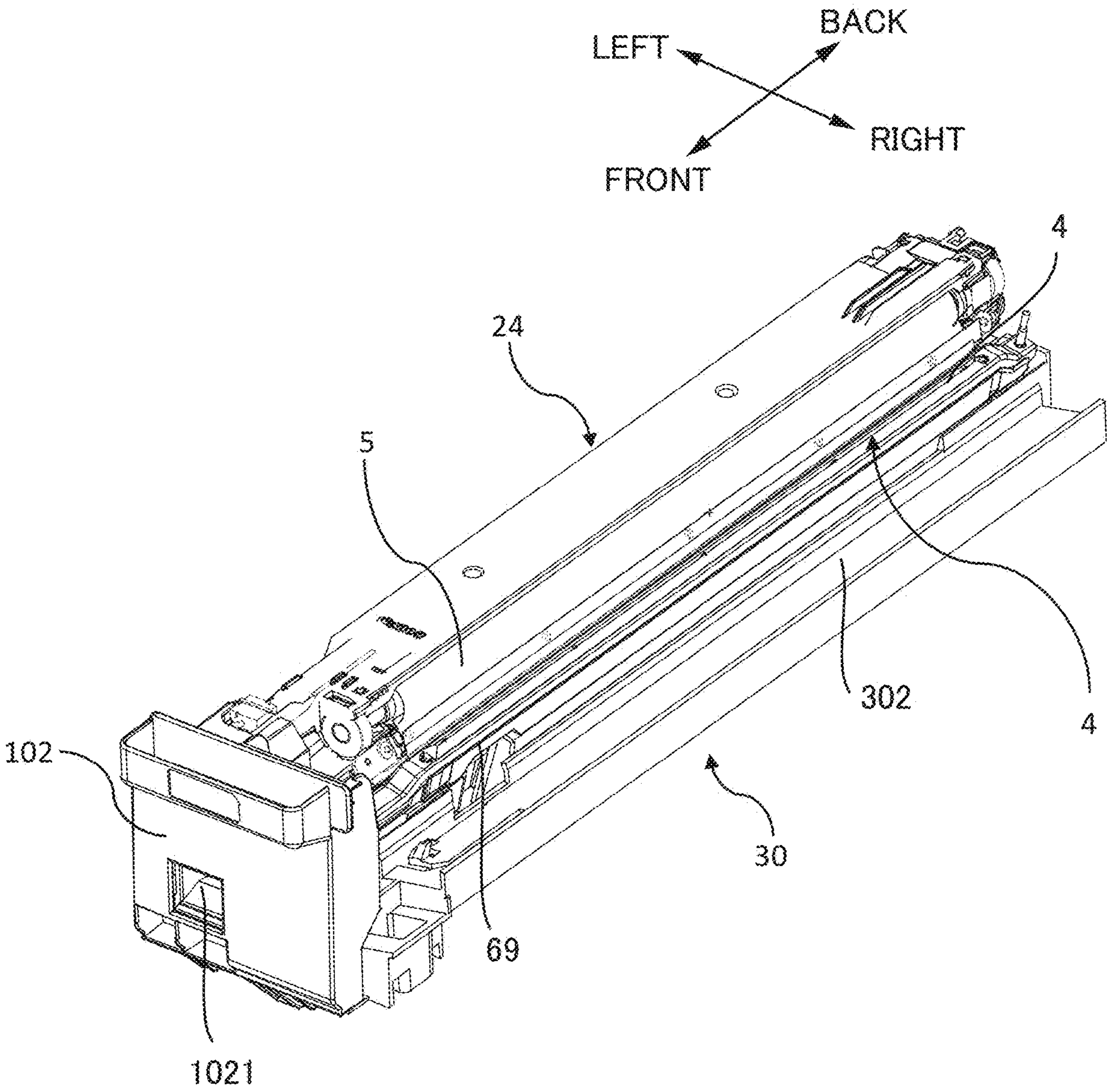
FIG. 13 is a perspective view of the cartridge tray.
Figure 14:
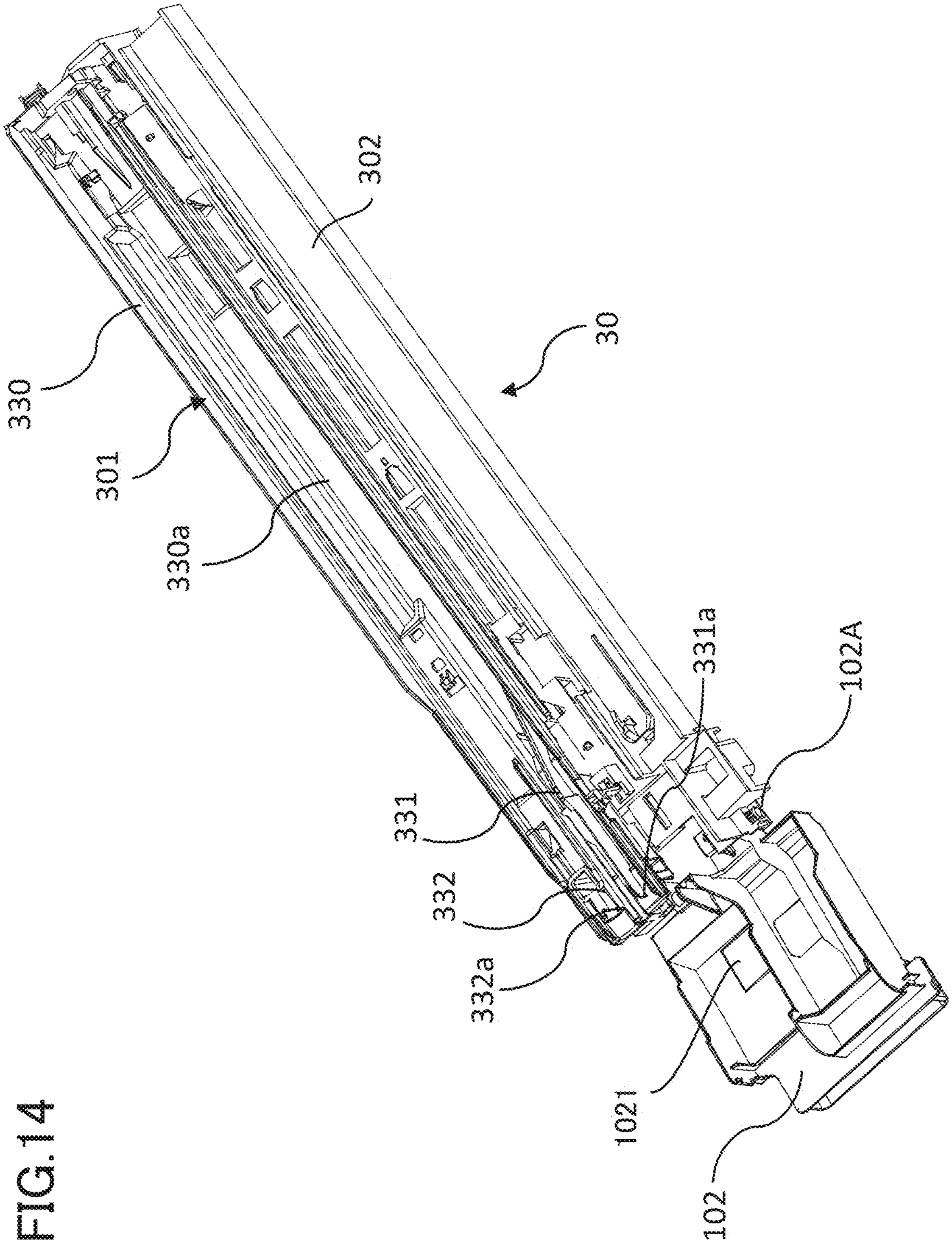
FIG. 14 is a perspective view of the cartridge tray in a state where the inner door is opened.

As illustrated in FIG. 12, 13, or 14, the cartridge tray 30 includes a developing unit support tray 301 that guides and supports the insertion and extraction operation of the developing unit 24 along the longitudinal direction, and a drum unit support tray 302 that guides and supports the drum unit 23 along the longitudinal direction. The drum unit support tray 302 extends in the rotational axis direction of the photosensitive drum 2 so as to guide and support the drum unit 23 along the longitudinal direction. The developing unit support tray 301 serving as a supporting portion supports the developing unit 24 in an insertable and extractable manner along the longitudinal direction when attaching and detaching the developing unit 24 to and from the apparatus body 100A. As illustrated in FIG. 14, the developing unit support tray 301 includes a main body portion 330, and a first rail 331 and a second rail 332 that extend along the longitudinal direction on a surface 330*a* on the developing unit 24 side, i.e., developing apparatus side, of the main body portion 330. More specifically, the first rail 331 and the second rail 332 are disposed on the surface 330*a* that faces the developing unit 24. In other words, the first rail 331 and the second rail 332 are disposed on the exposure unit 4 side, i.e., exposing portion side, in the main body portion 330 with respect to a width direction intersecting the longitudinal direction. Also, in the present embodiment, among the first rail 331 and the second rail 332, the first rail 331 is positioned on the exposure unit 4 side with respect to the width direction. That is, the first rail 331 is located closer to the exposure unit 4 in the width direction than the second rail is.

A portion of the cartridge tray 30 is arranged directly below the developing unit 24. A cooling space 310 through which air that has been supplied from outside the apparatus body 100A can pass is formed between the developing unit support tray 301 and the developing unit 24 to cool the developing unit 24. The cooling space 310 is a space surrounded by the developing unit 24, and the main body portion 330, the first rail 331, and the second rail 332 of the developing unit support tray 301, in a state where the developing unit 24 is attached to the developing unit support tray 301. As described in detail below, an opening on a first end side, i.e., front side, in the longitudinal direction of the cooling space 310 is communicated with a developing unit duct 1051 (refer for example to FIGS. 18 and 19) of a developing unit duct portion 105 disposed on the developing unit 24, by which external air supplied through the inner door duct 1021 of the inner door 102 may flow therein.

Figure 15:
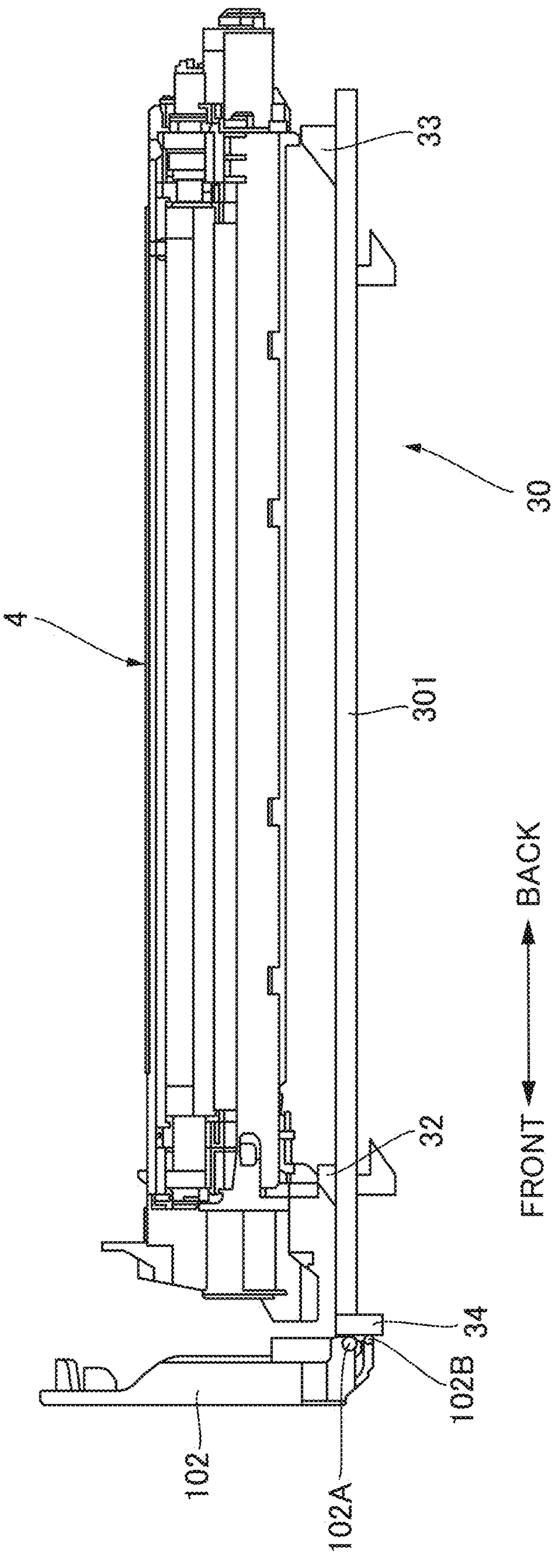
FIG. 15 is a side view of the cartridge tray in a state where the inner door is closed.
Figure 16:
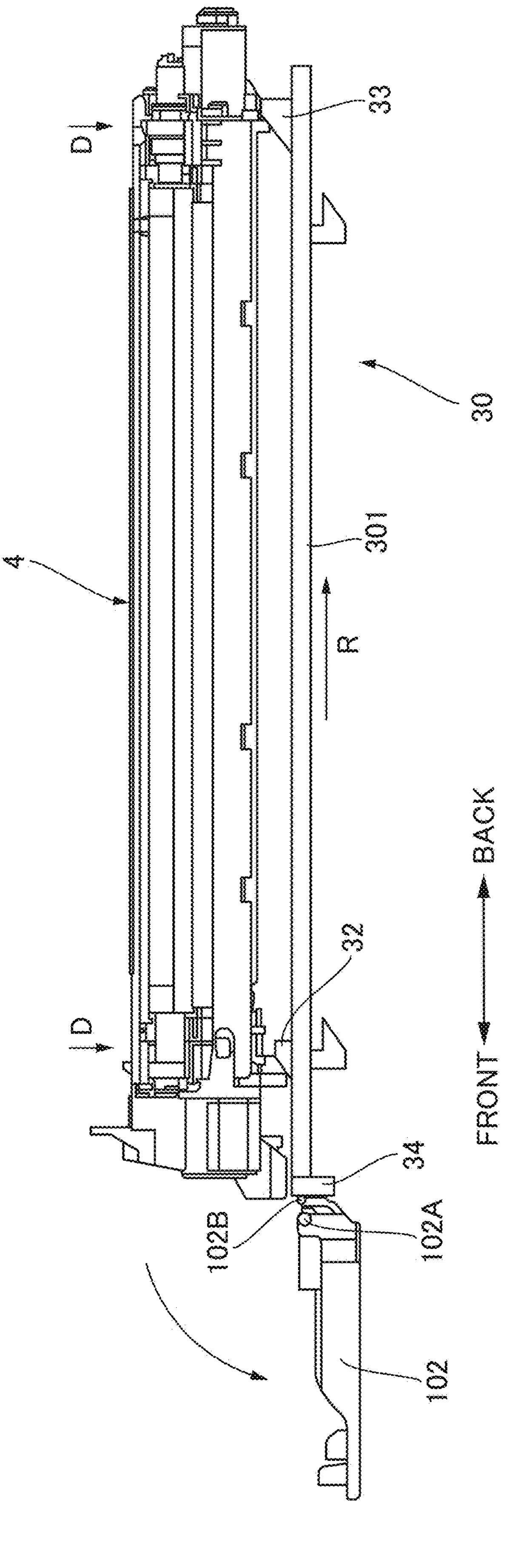
FIG. 16 is a side view of the cartridge tray in a state where the inner door is opened.

As illustrated in FIGS. 15 and 16, the developing unit support tray 301, a developing unit pressing front cam 32, a developing unit pressing rear cam 33, and a developing unit stay link 34 are disposed on the cartridge tray 30. The developing unit pressing front cam 32 and the developing unit pressing rear cam 33 are fixed to the developing unit support tray 301, supporting and pressing the developing unit 24 toward the photosensitive drum 2. The developing unit stay link 34 engaged with the inner door 102 is fixed to an end portion on a front side of the developing unit support tray 301. On the inner door 102, a link engagement portion 102B which is a portion that is engaged with the developing unit stay link 34 is arranged at a position closer to an end portion than a pivot shaft 102A. Therefore, in response to the rotation of the inner door 102, the link engagement portion 102B moves in the direction of rotation of the door along a circular locus whose radius is a distance between the pivot shaft 102A and the link engagement portion 102B.

That is, as illustrated in FIG. 16, when the inner door 102 is opened, the link engagement portion 102B is also rotated and moved toward the rear side of the apparatus. Thereby, the developing unit stay link 34 being engaged with the link engagement portion 102B is slid to an arrow R direction, which is the rear direction of the apparatus, and the two developing unit pressing cams 32 and 33 that are integrated via the developing unit support tray 301 serving as a slide member also slide in the R direction. This means that the two developing unit pressing cams 32 and 33 are moved out of the position in which they are supporting the developing unit 24, as illustrated in FIG. 16, and the developing unit 24 is moved by its own weight to an arrow D direction, which is a direction moving away from the photosensitive drum 2. As described above, the developing unit 24 is separated from the photosensitive drum 2 in an interlocked manner with the operation of opening the inner door 102. When closing the inner door 102 by a procedure opposite to that of the opening operation, the developing unit 24 approaches the photosensitive drum 2.

Exposure Unit Contact/Separation Mechanism

Figure 17A:
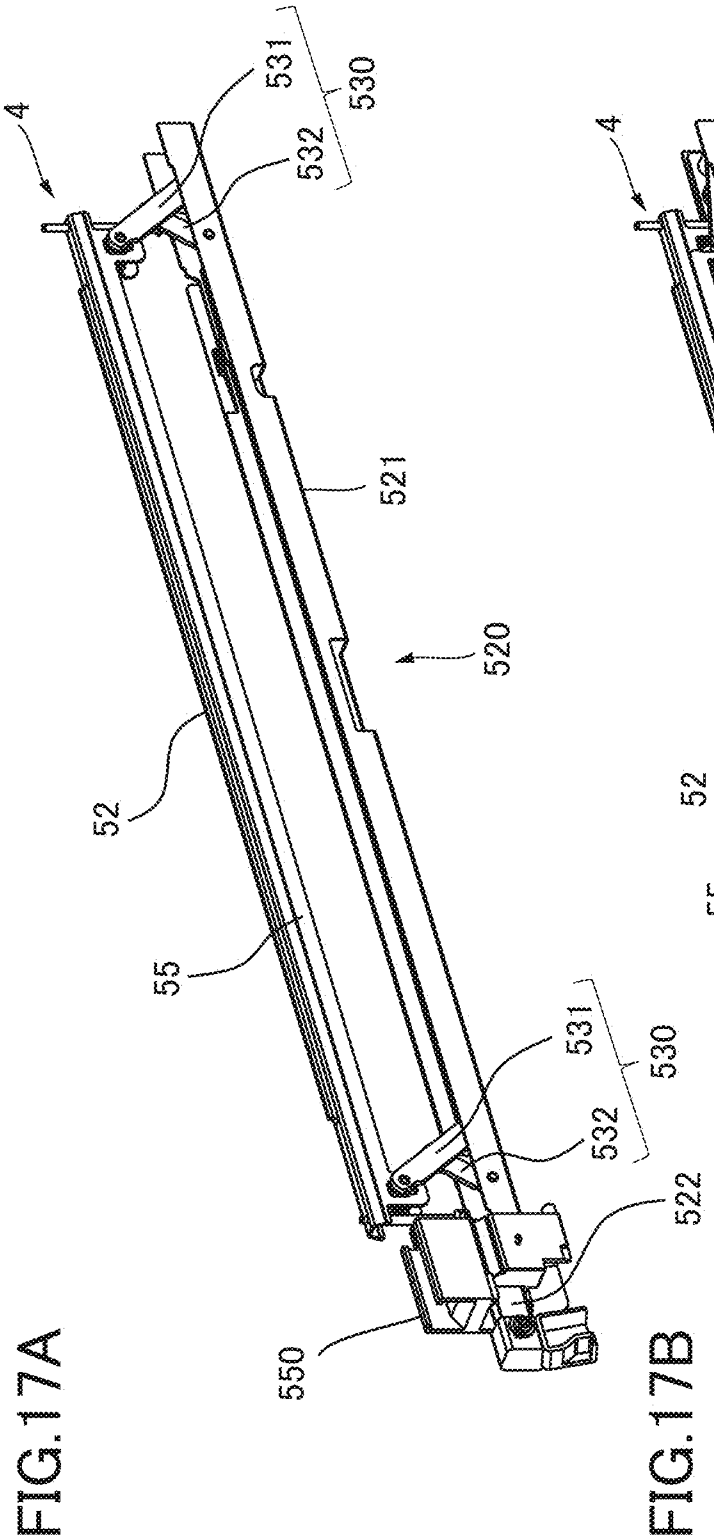
FIG. 17A is a view illustrating a contact/separation mechanism of the exposure unit, wherein the exposure unit is at an exposure position.
Figure 17B:
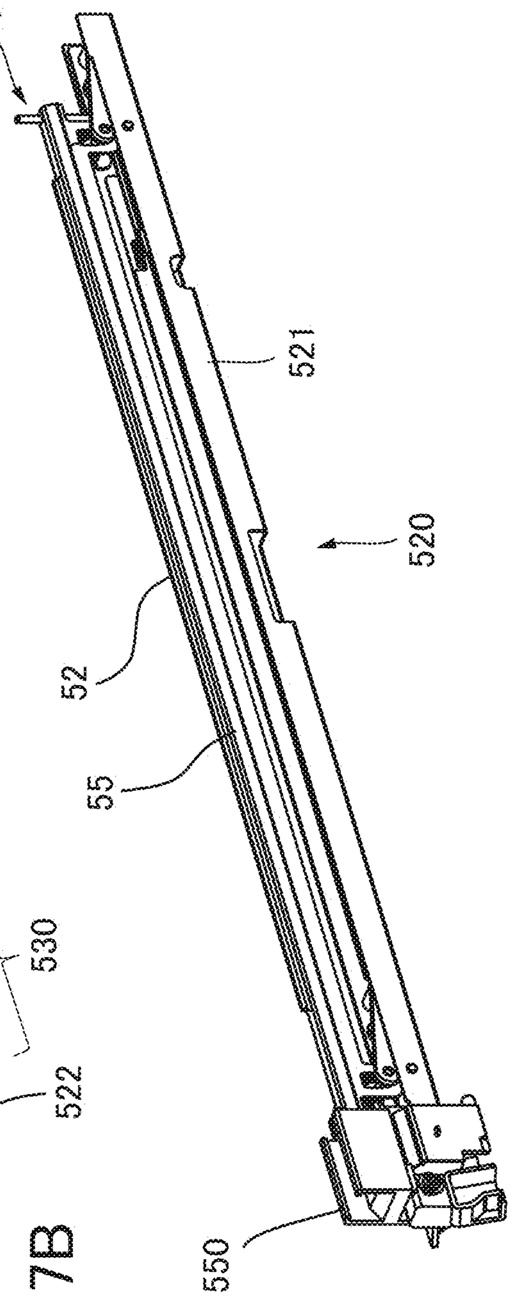
FIG. 17B is a view illustrating a contact/separation mechanism of the exposure unit, wherein the exposure unit is at a separated position.

Next, a contact/separation mechanism of the exposure unit 4 will be described with reference to FIGS. 17A and 17B. FIG. 17A illustrates a state in which the exposure unit 4 is at an exposure position, and FIG. 17B illustrates a state in which the exposure unit 4 is at a separated position. As illustrated in FIGS. 17A and 17B, a contact/separation mechanism 520 of the exposure unit 4 includes a frame body 521, a slide member 522, and a link mechanism 530. The frame body 521 is formed by bending a metal plate into a U shape by press-forming. The frame body 521 is a long length member that extends in the rotational axis direction of the photosensitive drum 2, and both end portions thereof in the longitudinal direction are fixed to the apparatus body 100A.

The slide member 522 is disposed movably in the longitudinal direction with respect to the frame body 521 on a first end side, i.e., front side, in the longitudinal direction of the frame body 521. When the slide member 522 moves in the longitudinal direction, the link mechanisms 530 disposed on both ends of the frame body 521 pivot to move the exposure unit 4 in the up-down direction. The link mechanism 530 includes a link member 531 connecting the casing support member 55 and the slide member 522 of the exposure unit 4, and a link member 532 connecting the link member 531 and the frame body 521. Along with the opening/closing operation of the inner door 102, the slide member 522 moves in siding motion in the longitudinal direction with respect to the frame body 521. The link members 531 and 532 pivot in an interlocked manner with the sliding movement of the slide member 522, and the exposure unit 4 moves in the up-down direction. In the present embodiment, as illustrated in FIG. 17A, when the slide member 522 moves frontward with respect to the frame body 521, the link members 531 and 532 pivot in an interlocked manner therewith, and the exposure unit 4 elevates to the exposure position. Meanwhile, as illustrated in FIG. 17B, when the slide member 522 moves rearward with respect to the frame body 521, the link members 531 and 532 pivot in an interlocked manner, and the exposure unit 4 descends to the separated position.

Cooling Configuration of Developing Unit

Figure 18:
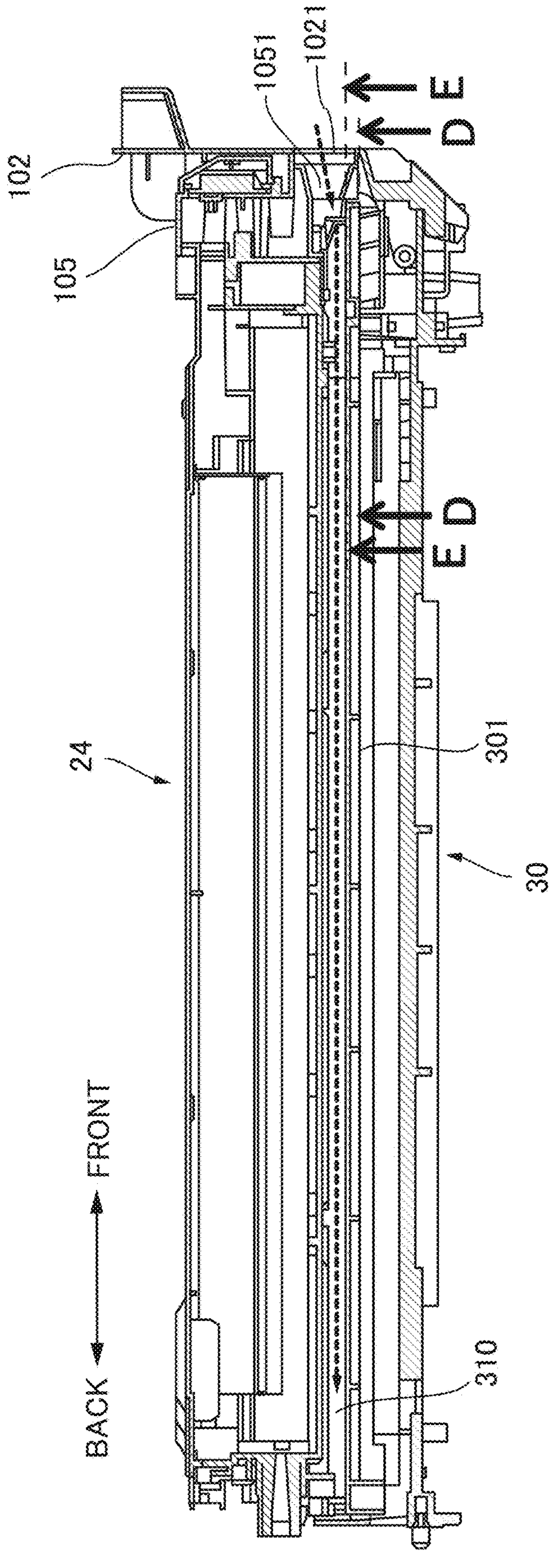
FIG. 18 is a cross-sectional view of the developing unit.

In the developing unit 24, the conveyance screw 7 and toner being agitated and conveyed by the conveyance screw 7 are accommodated in the developer container, and the temperature of the developing unit 24 rises due to frictional heat that is generated in toner at the bearing portion of the conveying screw 7 being rotated at high speed. When the image forming operation ends, the temperature of the developing unit 24 drops gradually, but during the period of time when the image forming is continued, the temperature of the developing unit 24 keeps on rising as high as the thermal capacity of the developing unit 24 allows, and reaches a high temperature. Since toner tends to melt by heat, in a case where the temperature of the developing unit 24 rises to a predetermined temperature or higher, toner melts within the developer container and adheres to the developing sleeve 5, causing coating failure of the developing sleeve 5 which may lead to developing defects. In order to prevent this from happening, the developing unit 24 must be cooled so as to prevent the temperature of the developing unit 24 from rising to a predetermined temperature or higher. A cooling configuration for cooling the developing unit 24 will be described based on FIGS. 18 and 19 with reference to FIG. 8. In FIG. 18, flow of air, i.e., airflow, for cooling the developing unit 24 is illustrated by the dotted line arrow.

In order to generate an airflow for cooling the developing unit 24, for example, a cooling fan not shown is disposed on the front cover 101. The air blown by the cooling fan enters from the opening 41*a* of the front door duct 41 and passes through the inner door duct 1021 of the inner door 102. The developing unit duct portion 105 is disposed on the developing unit 24 such that the air having passed through the inner door duct 1021 is guided to the lower side of the developing unit 24 and flown into the cooling space 310.

The size, i.e., cross-sectional area, of the inner door duct 1021 should preferably be large so as to take in as much air as possible. Meanwhile, the gap between an upper surface of the developing unit support tray 301 and a bottom surface of the developing unit 24, i.e., the cooling space 310, should preferably be suppressed to a minimum necessary size so as to avoid increase in size of the image forming apparatus 100 in the up-down direction. If air is passed through the inner door duct 1021 to the cooling space 310 whose size differs significantly, the fluid resistance of air becomes high due to the abrupt size change, and the cooling efficiency of the developing unit 24 by external air may be deteriorated.

Developing Unit Duct Portion

Therefore, the developing unit 24 includes the developing unit duct portion 105 disposed on a first end side, i.e., front side, in the longitudinal direction. The developing unit duct portion 105 is provided with the developing unit duct 1051 communicated with the cooling space 310 such that the air flowing in from the outer side by the operation of the cooling fan is guided via the inner door duct 1021 to the cooling space 310. The developing unit duct 1051 is formed such that the size thereof on the cooling space 310 side becomes gradually smaller than the size thereof on the inner door duct 1021 side, and by communicating the inner door duct 1021 and the cooling space 310 smoothly such that the size does not change abruptly, the deterioration of cooling efficiency of the developing unit 24 is suppressed. The air flowing in via the front door duct 41, the inner door duct 1021, and the developing unit duct 1051 into the cooling space 310 flows from the front side toward the rear side in the longitudinal direction and cools the developing unit 24. As described, in the cooling configuration of the developing unit 24 according to the present embodiment, the cooling space 310 formed between the developing unit 24 and the developing unit support tray 301 forms a flow path through which airflow created by the cooling fan passes.

Figure 19:
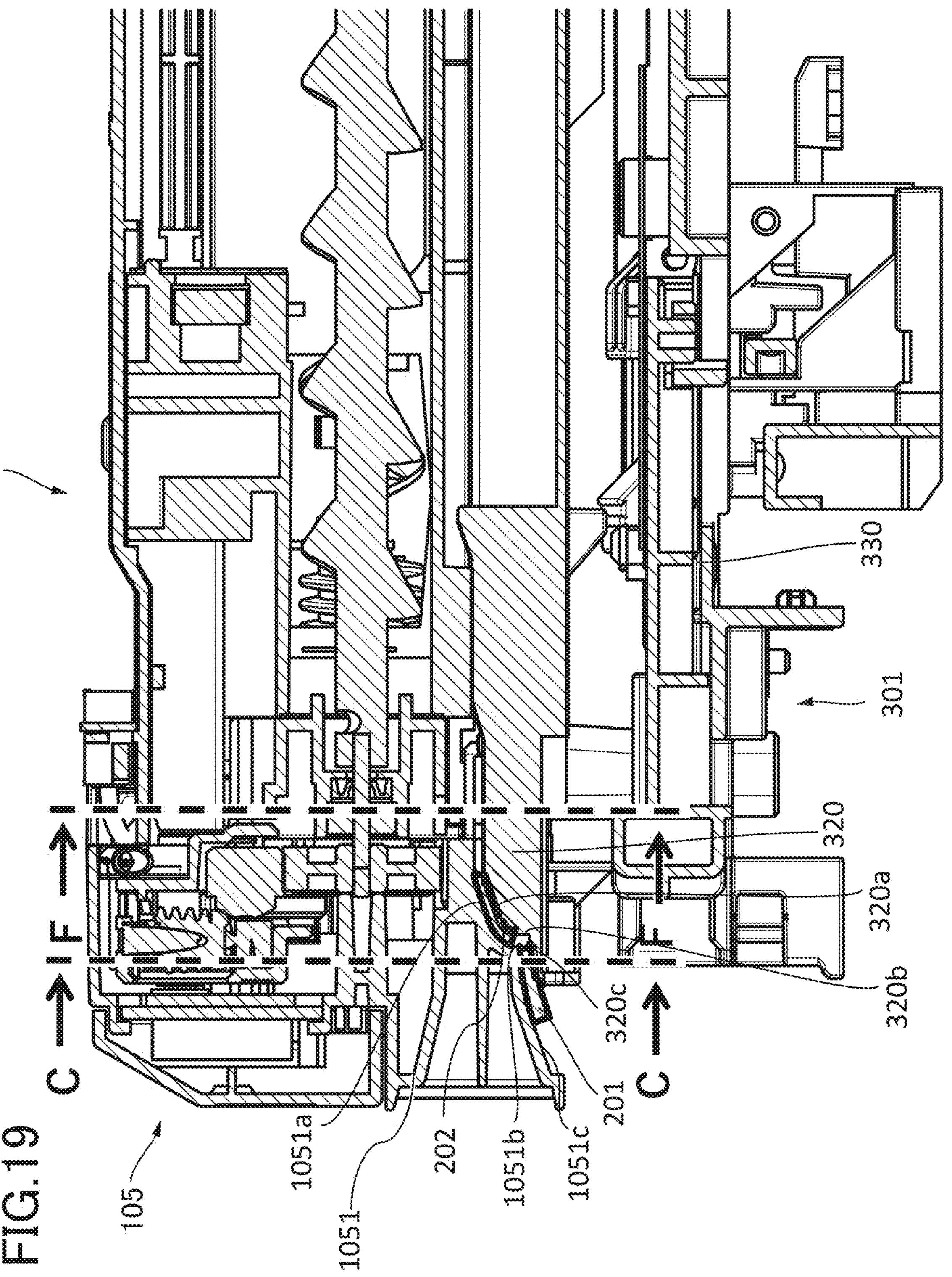
FIG. 19 is a cross-sectional view of a developing unit duct portion in enlarged view.

As illustrated in FIG. 19, a portion of the developing unit duct 1051 of the developing unit duct portion 105 is arranged in an overlapped manner with the developing unit support tray 301 with respect to an inserting direction in which the developing unit 24 is inserted to the developing unit support tray 301. Further, a portion of the developing unit duct 1051 and the developing unit support tray 301 are overlapped with each other in the up-down direction.

In the present embodiment, the developing unit duct 1051 has a stepped portion 1051*b* on a bottom surface. The stepped portion 1051*b* divides the bottom surface of the developing unit duct 1051 into a downstream surface 1051*a* arranged downstream in the inserting direction and an upstream surface 1051*c* that is arranged upstream in the inserting direction and that protrudes below the downstream surface 1051*a*. The main body portion 330 of the developing unit support tray 301 has, on the upstream side in the inserting direction, a duct receiving portion 320 that faces the bottom surface of the developing unit duct 1051 in a state where the developing unit 24 is supported on the developing unit support tray 301. The duct receiving portion 320 is composed of a bottom surface, hereinafter also referred to as a second surface 320*c*, disposed further upstream of upstream ends, that is, tip portions, of the first rail 331 and the second rail 332 (refer to FIG. 14), and upper surface portions, hereinafter referred to as first surfaces 320*a*, of the first rail 331 and the second rail 332 of the main body portion 330 with respect to the inserting direction of the developing unit 24. The surface of the duct receiving portion 320, that is, the bottom surface of the main body portion 330 disposed upstream of the first rail 331 and the second rail 332 and the surfaces facing the bottom surface of the developing unit duct 1051 on the upstream ends of the first rail 331 and the second rail 332, is designed to align with the bottom surface, i.e., the downstream surface 1051*a*, the stepped portion 1051*b*, and the upstream surface 1051*c*, of the developing unit duct 1051. That is, a stepped portion 320*b* is disposed on the surface of the duct receiving portion 320 so as to divide the surface into the first surfaces 320*a* downstream in the inserting direction and facing the downstream surface 1051*a*, and the second surface 320*c* upstream in the inserting direction and facing the upstream surface 1051*c*.

As described above, the stepped portion 1051*b* is formed on the bottom surface of the developing unit duct 1051. The developing unit duct 1051 is preferably formed such that the size, i.e., cross-sectional area, thereof on the cooling space 310 side becomes gradually smaller than the size, i.e., cross-sectional area, thereof on the inner door duct 1021 side. If air is passed through from the inner door duct 1021 to the cooling space 310 whose size differs significantly, the fluid resistance of air becomes high due to the abrupt size change, and the cooling efficiency of the developing unit 24 may be deteriorated, such that from the viewpoint of fluid resistance of air, it is not desirable to change the size of the flow path abruptly within the developing unit duct 1051. Thus, the developing unit duct 1051 is formed such that the size thereof on the cooling space 310 side becomes gradually smaller than the size thereof on the inner door duct 1021 side, and such that the inner door duct 1021 and the cooling space 310 are smoothly communicated so that there is no abrupt size change, by which the deterioration of cooling efficiency of the developing unit 24 is suppressed.

A gap is formed between the bottom surface, i.e., the downstream surface 1051*a*, the stepped portion 1051*b*, and the upstream surface 1051*c*, of the developing unit duct 1051 and the surface, i.e., the first surface 320*a*, the stepped portion 320*b*, and the second surface 320*c* of the duct receiving portion 320. In the present embodiment, the gap is formed so as to avoid dynamic interaction during insertion and extraction of the developing unit 24 that is detachably attached to the developing unit support tray 301. Further, the gap may be formed due to tolerance of components, such as dispersion of molded products. However, if a gap is formed, a portion of air having passed through the developing unit duct 1051 may flow into the apparatus body 100A through the formed gap without passing through the cooling space 310. Specifically, if air flows into the apparatus body 100A from the exposure unit 4 side, not only the cooling efficiency of the developing unit 24 deteriorates, but there is also a risk that the toner scattered by the air flow may adhere to the exposure unit 4 and cause image defects.

Therefore, according to the present embodiment, two sealing members having elasticity, which are a first sealing member and a second sealing member, are disposed on the developing unit duct portion 105 so as to suppress the leakage of air through the gap formed between the developing unit duct 1051 and the developing unit support tray

301 especially toward the exposure unit 4 side. The sealing members will be described below based on FIGS. 19 to 22 with reference to FIG. 14.

First Sealing Member and Second Sealing Member

Figure 20:
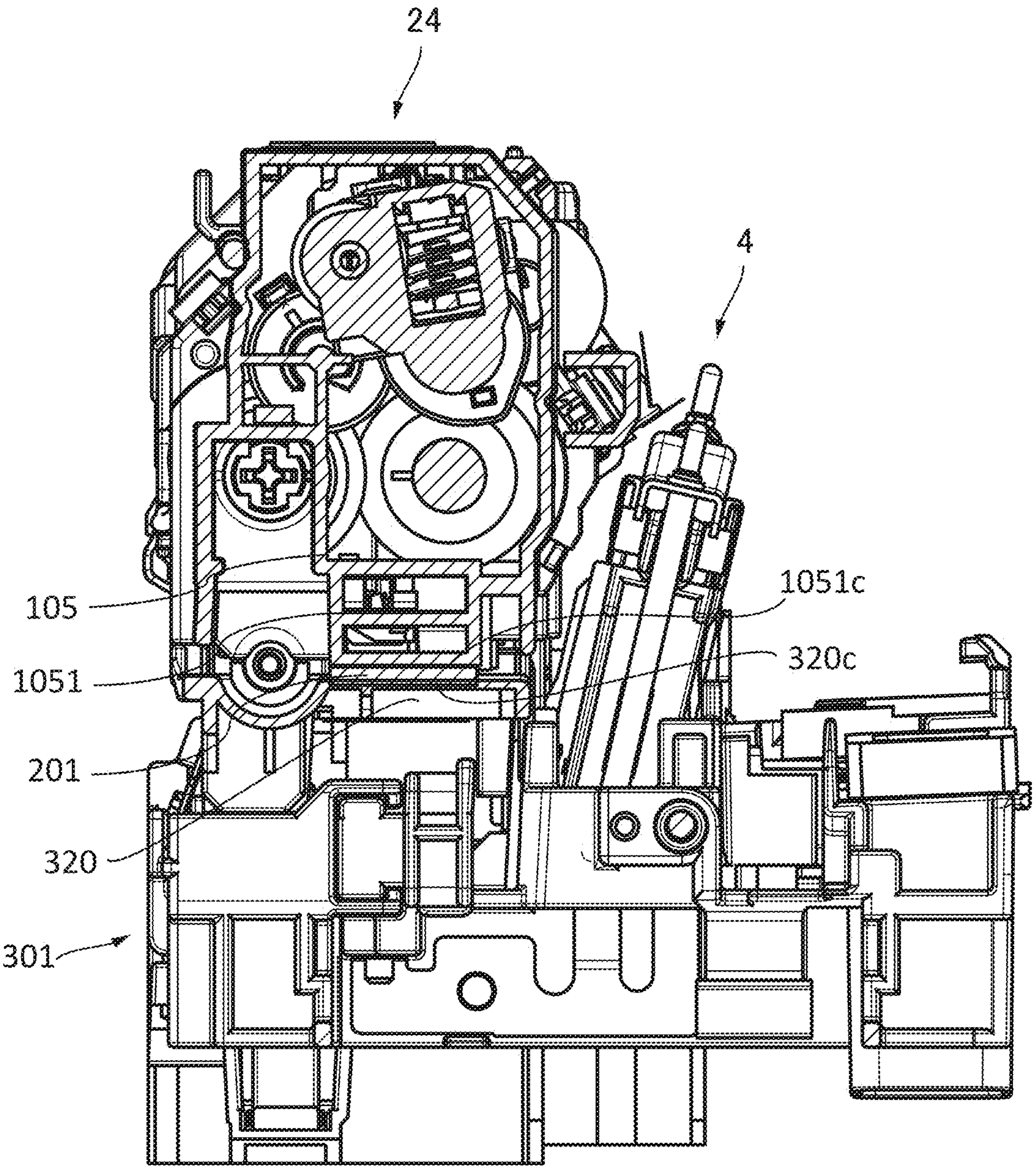
FIG. 20 is a cross-sectional view taken at a C-C arrow of FIG. 19 viewed from a front side.
Figure 22:
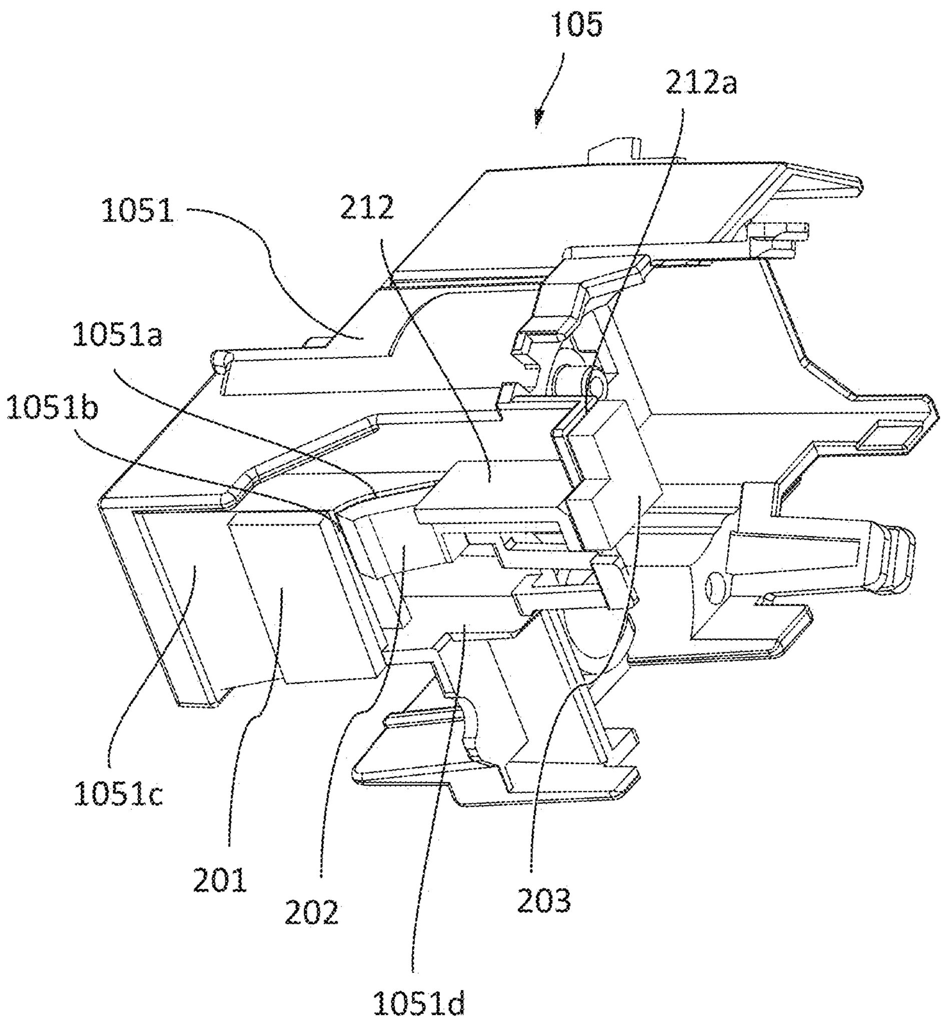
FIG. 22 is a perspective view illustrating an arrangement of a first sealing member, a second sealing member, and a third sealing member.

As illustrated in FIGS. 19 and 20, according to the present embodiment, a first sealing member 201 seals a space between the upstream surface 1051*c* of the developing unit duct 1051 and the second surface 320*c* disposed further upstream of the upstream ends of the first rail 331 and the second rail 332 (refer to FIG. 14) with respect to the inserting direction of the main body portion 330 of the developing unit support tray 301 in a state where the developing unit 24 is attached. The first sealing member 201 is compressed elastically in the up-down direction between the upstream surface 1051*c*, i.e., first surface on the main body portion side, of the developing unit duct 1051 and the second surface 320*c*, i.e., second surface, of the main body portion 330. As illustrated in FIG. 22, the first sealing member 201 is adhered to the upstream surface 1051*c* of the developing unit duct 1051.

If the first sealing member 201 according to the present embodiment is not disposed, the air having passed through the developing unit duct 1051 may flow through the gap between the upstream surface 1051*c* of the developing unit duct 1051 and the second surface 320*c* of the main body portion 330 into the apparatus body 100A from the upstream side in the inserting direction or from both end portions in the width direction. By disposing the first sealing member 201, even if a portion of air having passed through the developing unit duct 1051 is flown between the upstream surface 1051*c* of the developing unit duct 1051 and the second surface 320*c* of the main body portion 330, the air is suppressed from entering the apparatus body 100A.

Figure 21:
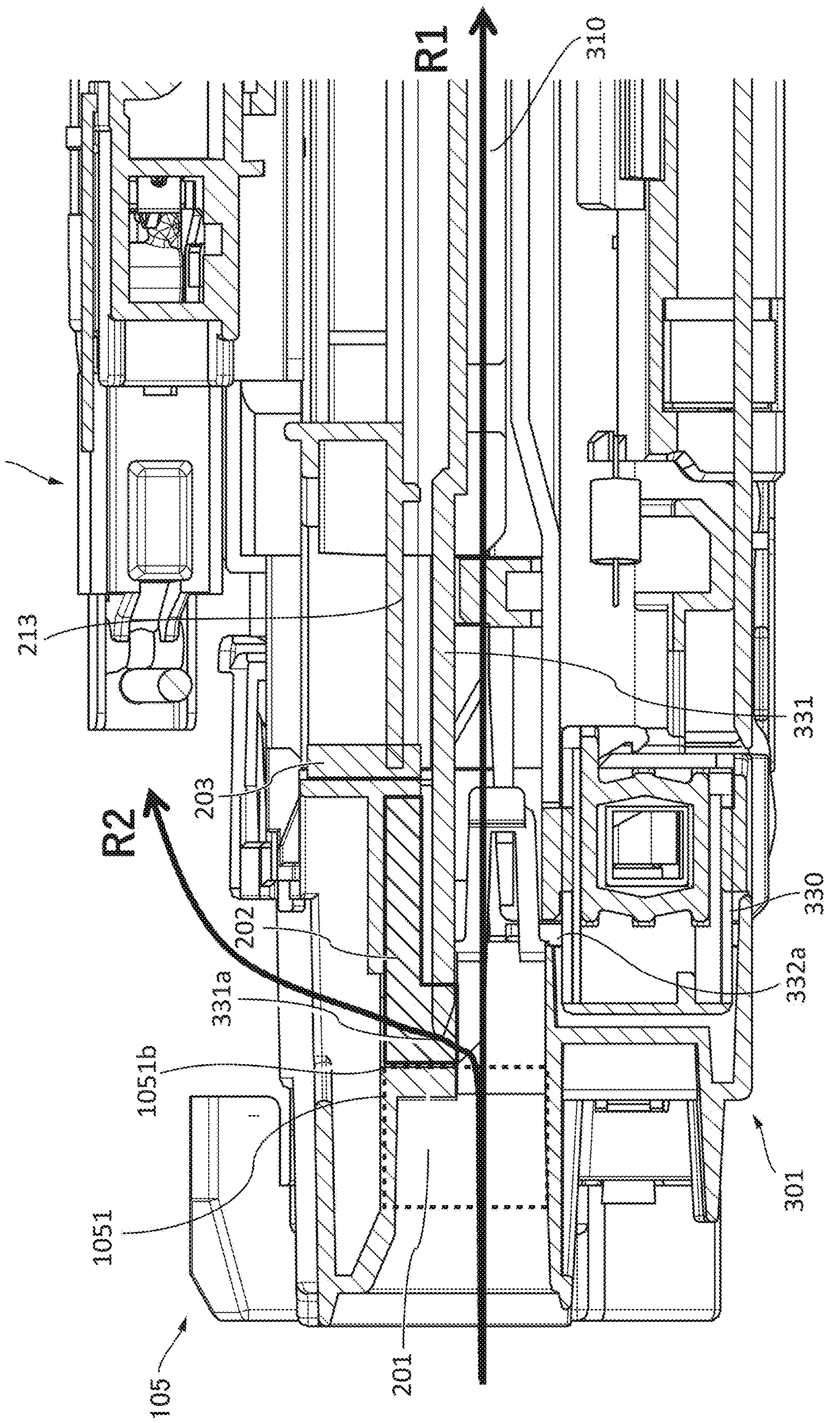
FIG. 21 is a cross-sectional view taken at a D-D arrow of FIG. 18 viewed from a bottom side.

As illustrated in FIGS. 19 and 21, a second sealing member 202 is disposed on a downstream side of the first sealing member 201 with respect to the inserting direction of the developing unit 24. Then, the second sealing member 202 seals the space between the downstream surface 1051*a* of the developing unit duct 1051 and the upstream end 331*a* in the inserting direction of the first rail 331 that is closer to the exposure unit 4 than the second rail 332 in the width direction in a state where the developing unit 24 is attached. The second sealing member 202 is adhered to the downstream surface 1051*a* of the developing unit duct 1051 in a manner elastically compressed in the inserting direction between the downstream surface 1051*a* of the developing unit duct 1051 and the upstream end 331*a* in the inserting direction of the first rail 331, as illustrated in FIG. 22.

In order to cool the developing unit 24 efficiently, it is desirable that air having passed through the developing unit duct 1051 flows through a path illustrated by arrow R1 in FIG. 21 with very little leak with respect to the cooling space 310. If the second sealing member 202 according to the present embodiment is not disposed, a gap may be formed between the developing unit duct 1051 and the upstream end 331*a* in the inserting direction of the first rail 331, and air having passed through the developing unit duct 1051 may leak through the gap from the first end side in the width direction, as illustrated by arrow R2 of FIG. 21. By disposing the second sealing member 202, air having passed through the developing unit duct 1051 flows into the cooling space 310 with minimal leakage. Further, the second sealing member 202 is arranged such that a portion thereof is overlapped with the first sealing member 201 along the downstream surface 1051*a* with respect to the width direction when viewed in the inserting direction of the developing unit 24. Further, the second sealing member 202 is disposed to extend downstream along the inserting direction of the developing unit 24 from the stepped portion 1051*b*. This arrangement is adopted to allow the air suppressed of any leakage by the first sealing member 201 and the second sealing member 202 to flow toward the cooling space 310.

As described above, the stepped portion 1051*b* is formed on the bottom surface of the developing unit duct 1051 (refer to FIG. 22). Therefore, if the first sealing member 201 and the second sealing member 202 are formed as an integrated sealing member and adhered to the bottom surface of the developing unit duct 1051, a minute gap will be formed at the edge of the stepped portion 1051*b*, and air may leak through the gap. Therefore, if a single sealing member is adhered to the bottom surface of the developing unit duct 1051, there is a need to prevent any gap from being formed at the edge of the stepped portion 1051*b*, which will require a complex shape of the sealing member, require time to perform the adhesion thereof, and require an additional step of confirming that the sealing member is adhered without any gap. In consideration of the above drawbacks, according to the present embodiment, the sealing member is divided into the first sealing member 201 and the second sealing member 202 and adhered to the bottom surface of the developing unit duct 1051.

Further, as illustrated in FIG. 22, the developing unit duct 1051 includes a duct rib 1051*d* that protrudes downward from the downstream surface 1051*a* and that extends in the inserting direction of the developing unit 24 at a first end of the downstream surface 1051*a* on the second rail 332 side with respect to the width direction. The duct rib 1051*d* suppresses leakage of air from the opposite side of the exposure unit 4 with respect to the width direction through a gap that may be formed between the downstream surface 1051*a* of the developing unit duct 1051 and the first surface 320*a* of the main body portion 330.

Third Sealing Member

Figure 23:
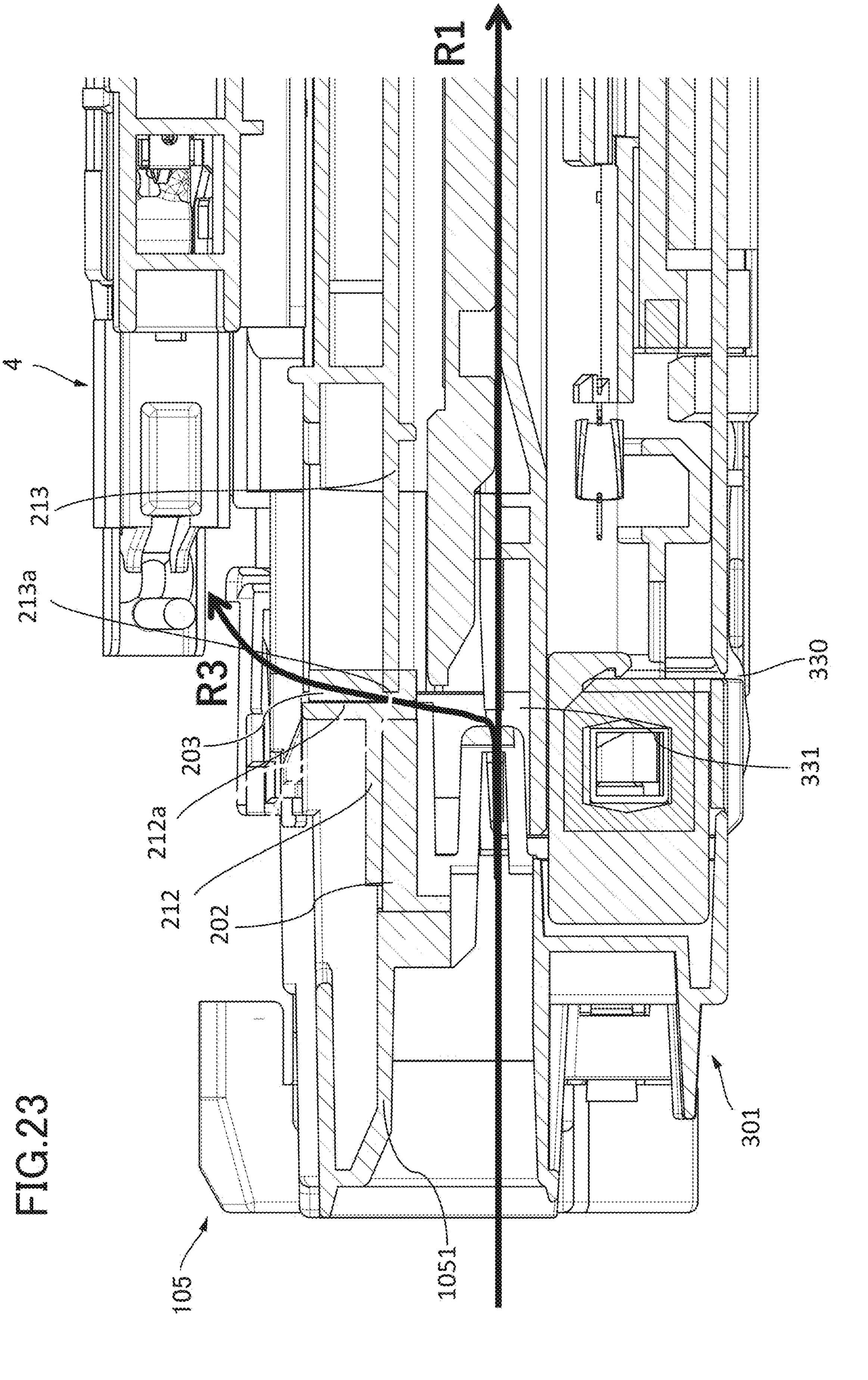
FIG. 23 is a cross-sectional view taken at an E-E arrow of FIG. 18 viewed from a bottom side.

In the present embodiment, in addition to the first sealing member 201 and the second sealing member 202 described above, a third sealing member 203 is disposed on the developing unit duct 1051, as illustrated in FIG. 22. As illustrated in FIG. 22, the developing unit duct 1051 includes a duct rib 212 that extends along the inserting direction of the developing unit 24 on the outer side of the second sealing member 202 with respect to the width direction, and the third sealing member 203 is adhered to a downstream end portion 212*a* of the duct rib 212. As illustrated in FIG. 23, the developing unit 24 includes a tray rib 213 that extends in the inserting direction so as to overlap with the downstream end portion 212*a* of the duct rib 212 of the developing unit duct 1051 when viewed in the inserting direction of the developing unit 24. The third sealing member 203 seals the space between the downstream end portion 212*a* of the duct rib 212 of the developing unit duct 1051 and an upstream end 213*a* in the inserting direction of the tray rib 213 of the main body portion 330 in a state where the developing unit 24 is attached. The third sealing member 203 is adhered to the downstream end portion 212*a* of the duct rib 212, as described above, in a manner elastically compressed in the inserting direction between the downstream end portion 212*a* of the duct rib 212 and the upstream end 213*a* in the inserting direction of the tray rib 213.

As described above, in order to cool the developing unit 24 efficiently, it is desirable that air having passed through the developing unit duct 1051 flows through a path illustrated by arrow R1 of FIG. 23 almost without any leakage with respect to the cooling space 310. If the third sealing member 203 according to the present embodiment is not disposed, a gap may be formed between the developing unit duct 1051 and the upstream end 213*a* in the inserting direction of the tray rib 213, such that air having passed through the developing unit duct 1051 may leak through the gap from the first end side in the width direction, as illustrated by arrow R3 of FIG. 23. By disposing the third sealing member 203, air having passed through the developing unit duct 1051 flows into the cooling space 310 almost without any leakage.

Other Sealing Members

The first sealing member 201, the second sealing member 202, and the third sealing member 203 described above are all disposed on the developing unit duct 1051. According to the present embodiment, in addition to the three sealing members described above, a fourth sealing member 204, a fifth sealing member 205, a sixth sealing member 206, and a seventh sealing member 207 are disposed on the developing unit support tray 301, or more specifically, the main body portion 330.

Figure 24:
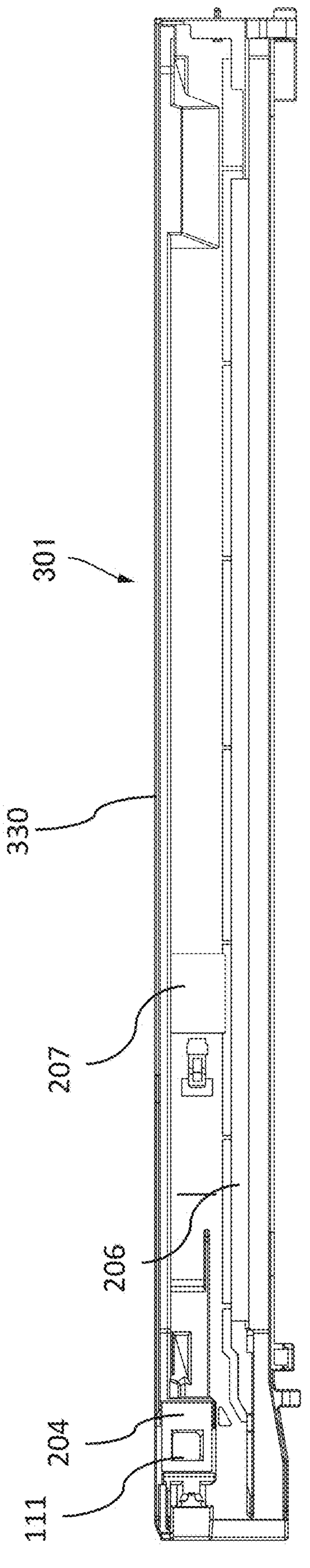
FIG. 24 is a top view of a developing unit support tray illustrating a fourth sealing member, a fifth sealing member, a sixth sealing member, and a seventh sealing member.
Figure 25:
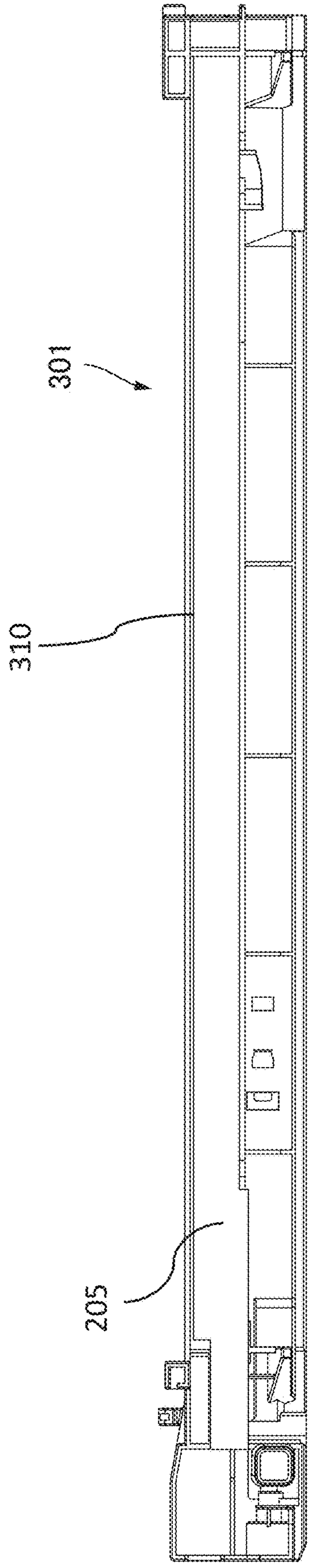
FIG. 25 is a bottom view of a developing unit support tray illustrating the fifth sealing member and the seventh sealing member.

As illustrated in FIG. 24, the fourth sealing member 204, the sixth sealing member 206, and the seventh sealing member 207 are disposed on the upper surface of a bottom portion of the main body portion 330. Further, as illustrated in FIG. 25, the fifth sealing member 205 is disposed on the lower surface of the bottom portion of the main body portion 330. The fourth sealing member 204, the fifth sealing member 205, the sixth sealing member 206, and the seventh sealing member 207 are disposed so as to prevent air passing through the cooling space 310 from leaking through holes and gaps formed on the bottom portion of the main body portion 330.

Figure 26:
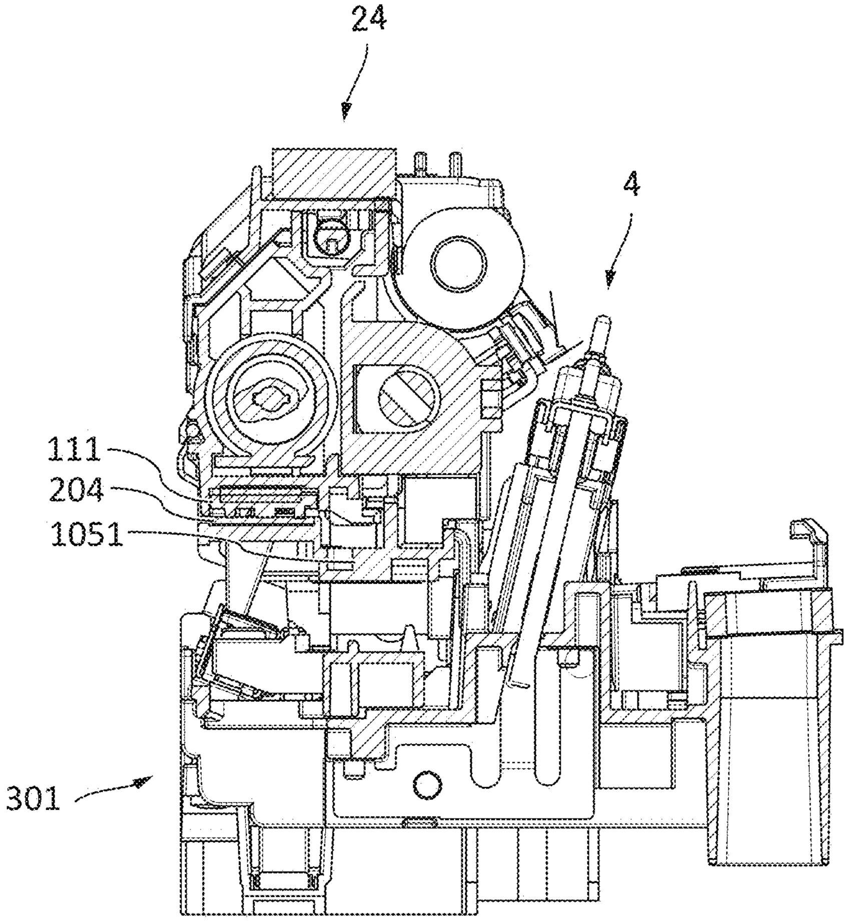
FIG. 26 is a cross-sectional view taken at an F-F arrow of FIG. 19 viewed from a front side.

As illustrated in FIGS. 24 and 26, the developing unit 24 includes a shutter 111 capable of opening and closing an opening portion formed on a bottom portion of the developer container for discharging used toner to the exterior of the developer container. By opening the shutter 111, toner is discharged from the developer container, and the discharged toner falls by its own weight to be collected in a toner collecting container not shown. The fourth sealing member 204 seals a gap formed between the toner collecting container and the upper surface of the bottom portion of the main body portion 330 so as to surround the opening portion of the developer container. Thereby, toner being discharged through the opening portion of the developer container will not be scattered in the apparatus body 100A.

As described above, according to the present embodiment, the first sealing member 201 is disposed in the gap formed between the bottom surface of the developing unit duct 1051 and the upper surface of the developing unit support tray 301. By having the first sealing member 201 elastically compressed in the up-down direction between the bottom surface of the developing unit duct 1051 and the upper surface of the developing unit support tray 301 to seal the gap, a portion of air having passed through the developing unit duct 1051 will not flow into the apparatus body 100A. The first sealing member 201 seals the entire area of the gap in the width direction, such that a portion of air having passed through the developing unit duct 1051 will not flow into the apparatus body 100A from the upstream side in the inserting direction or from both sides in the width direction. Further, the second sealing member 202 is disposed downstream of the first sealing member 201 with respect to the inserting direction of the developing unit 24 on the bottom surface of the developing unit duct 1051. By having the second sealing member 202 elastically compressed in the inserting direction between the developing unit duct 1051 and the first rail 331, the gap between the developing unit duct 1051 and the first rail 331 is sealed, and a portion of air having passed through the developing unit duct 1051 will not flow into the apparatus body 100A. The first rail 331 is a rail that is arranged on the exposure unit 4 side of the developing unit support tray 301, and by sealing the gap on the exposure unit 4 side by the second sealing member 202, it becomes possible to suppress a portion of air having passed through the developing unit duct 1051 from flowing to the exposure unit 4 side. Thereby, air flowing from the developing unit duct 1051 to the exposure unit 4 side without passing through the cooling space 310 may be suppressed while preventing the deterioration of cooling efficiency of the developing unit 24, such that the adhesion of toner on the exposure unit 4 caused by scattering of toner caused by the leakage of air through the gap formed between the developing unit duct 1051 and the developing unit support tray 301 may be suppressed.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-107388, filed Jul. 3, 2024, which is hereby incorporated by reference herein in its entirety.

What is claimed is:

1. An image forming apparatus comprising:

an apparatus body;

a photosensitive member;

an exposing portion including:

a plurality of light emitting elements arranged adjacent to the photosensitive member and aligned in a longitudinal direction of the photosensitive member, the light emitting elements being configured to emit light; and a lens array having a plurality of lenses configured to focus light emitted from the light emitting elements on a surface of the photosensitive member, the exposing portion being configured to expose the surface of the photosensitive member to form an electrostatic latent image;

a developing apparatus configured to be detachably attached to the apparatus body, the developing apparatus being arranged adjacent to the exposing portion with respect to a width direction intersecting the longitudinal direction in a state attached to the apparatus body, and being configured to develop the electrostatic latent image on the photosensitive member into a toner image;

a supporting portion configured to support the developing apparatus in an insertable and extractable manner along the longitudinal direction when attaching and detaching the developing apparatus to and from the apparatus body, the supporting portion including:

a main body portion; and first and second rails that are disposed along the longitudinal direction on a surface facing the developing apparatus of the main body portion, the first rail being closer to the exposing portion in the width direction than the second rail is;

a duct disposed on the developing apparatus and configured to allow air to flow in an inserting direction of the developing apparatus from an upstream side of the developing apparatus into a space surrounded by the developing apparatus, the main body portion, the first rail, and the second rail, in a state where the developing apparatus is attached to the apparatus body;

a first sealing member configured to seal a space between a first surface of the duct and a second surface of the main body portion in a state where the developing apparatus is attached to the apparatus body, the first surface being located on a main body portion side of the duct, the second surface being located further upstream of an upstream end of the first rail and an upstream end of the second rail in the inserting direction; and a second sealing member disposed downstream of the first sealing member in the inserting direction and configured to seal a space between the first surface and the upstream end in the inserting direction of the first rail in the state where the developing apparatus is attached to the apparatus body.

2. The image forming apparatus according to claim 1, wherein the first sealing member is configured to be elastically compressed in an up-down direction between the first surface of the duct and the second surface of the main body portion, and wherein the second sealing member is configured to be elastically compressed in the inserting direction between the first surface of the duct and the upstream end in the inserting direction of the first rail.

3. The image forming apparatus according to claim 2, wherein the duct includes a stepped portion configured to divide the first surface into an upstream side surface in the inserting direction and a downstream side surface in the inserting direction, wherein the first sealing member is adhered to the upstream side surface, and wherein the second sealing member is adhered to the downstream side surface.

4. The image forming apparatus according to claim 3, wherein a portion of the second sealing member in the width direction overlaps with the first sealing member when viewed in the inserting direction.

5. The image forming apparatus according to claim 1, wherein the duct includes a rib provided on the second rail side of the first surface in the width direction, the rib being configured to protrude downward from the first surface and extend in the inserting direction.

* * * * *